(12) United States Patent
Oto

(10) Patent No.: US 8,787,677 B2
(45) Date of Patent: Jul. 22, 2014

(54) IMAGE PROCESSING METHOD, IMAGE PROCESSING APPARATUS, AND PROGRAM

(75) Inventor: Hiroshi Oto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 13/216,955

(22) Filed: Aug. 24, 2011

(65) Prior Publication Data

US 2012/0051655 A1 Mar. 1, 2012

(30) Foreign Application Priority Data

Sep. 1, 2010 (JP) ................................. 2010-196092

(51) Int. Cl.
*G06T 9/20* (2006.01)
*G06T 9/00* (2006.01)
*G06K 9/48* (2006.01)

(52) U.S. Cl.
CPC ................ *G06K 9/481* (2013.01); *G06T 9/001* (2013.01)
USPC ............................. 382/197; 382/199; 382/242

(58) Field of Classification Search
None
See application file for complete search history.

(56) References Cited

U.S. PATENT DOCUMENTS 5,818,459 A * 10/1998 Kurumida ...................... 345/442
2005/0238244 A1* 10/2005 Uzawa .......................... 382/242

FOREIGN PATENT DOCUMENTS

| EP | 0482862 B1 | 1/2000 |
|----|------------|--------|
| JP | 04-116690 A | 4/1992 |
| JP | 04-287173 A | 10/1992 |
| JP | H11-016094 A | 1/1999 |
| JP | H11-203489 A | 7/1999 |
| JP | 3026592 A | 3/2000 |
| JP | 2005-310070 A | 11/2005 |
| JP | 2006-031245 A | 2/2006 |

* cited by examiner

*Primary Examiner* — Brian P Werner
(74) *Attorney, Agent, or Firm* — Fitzpatrick, Cella, Harper & Scinto

(57) ABSTRACT

Function approximation performed when a raster image is converted into a vector image is performed in a simple manner with high accuracy, without using feedback. When anchor points are extracted from a coordinate point sequence obtained from the raster image, and function approximation is performed on the coordinate point sequence between anchor points, an appropriate point among coordinate points defined in a unit approximation section that is partitioned by anchor points is selected, and after setting the direction of the corresponding coordinate point as a tangential direction, correction is performed such that the position of a control point obtained from a tangent line does not intersect another control point.

17 Claims, 19 Drawing Sheets

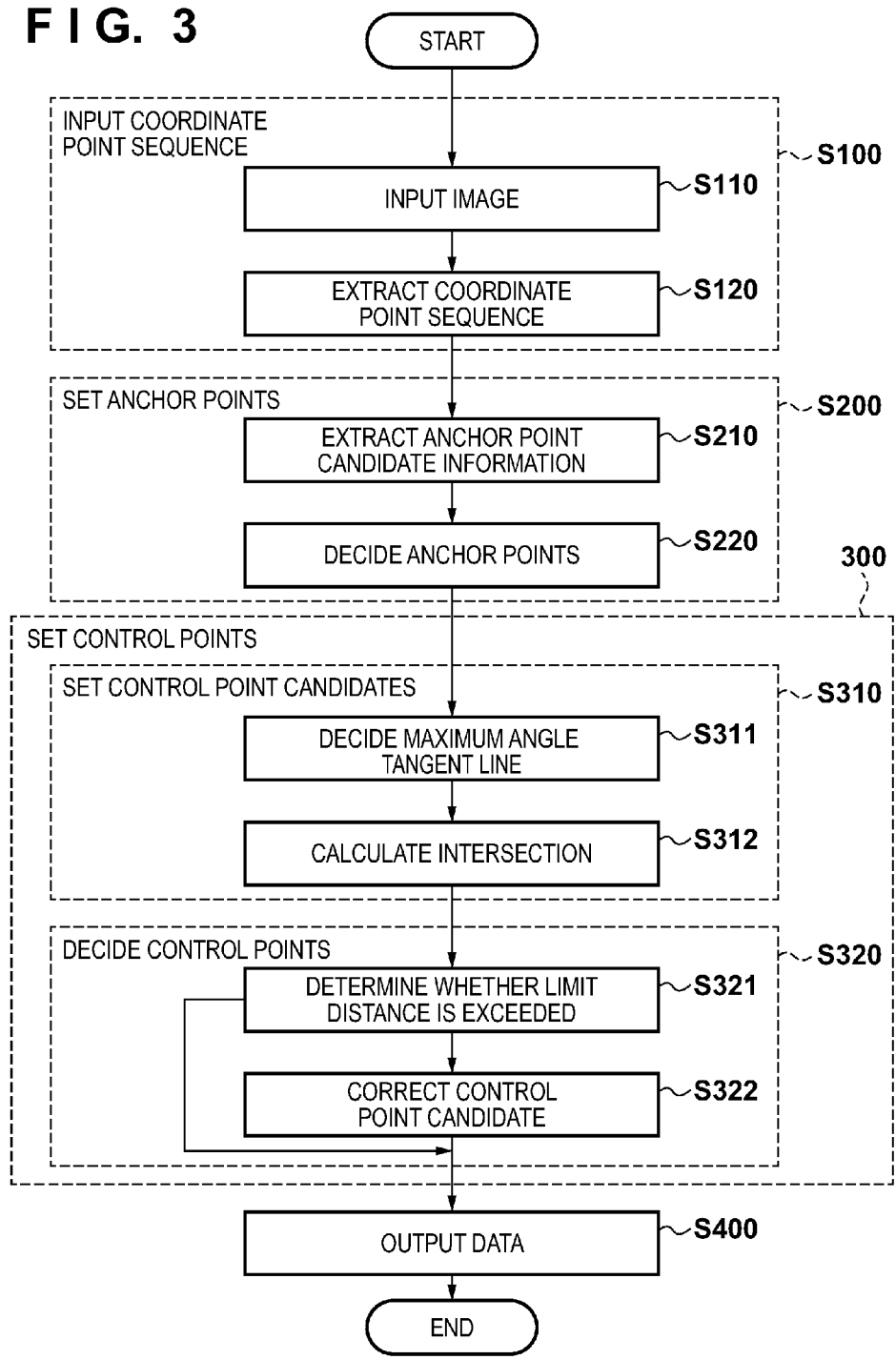

F I G. 8
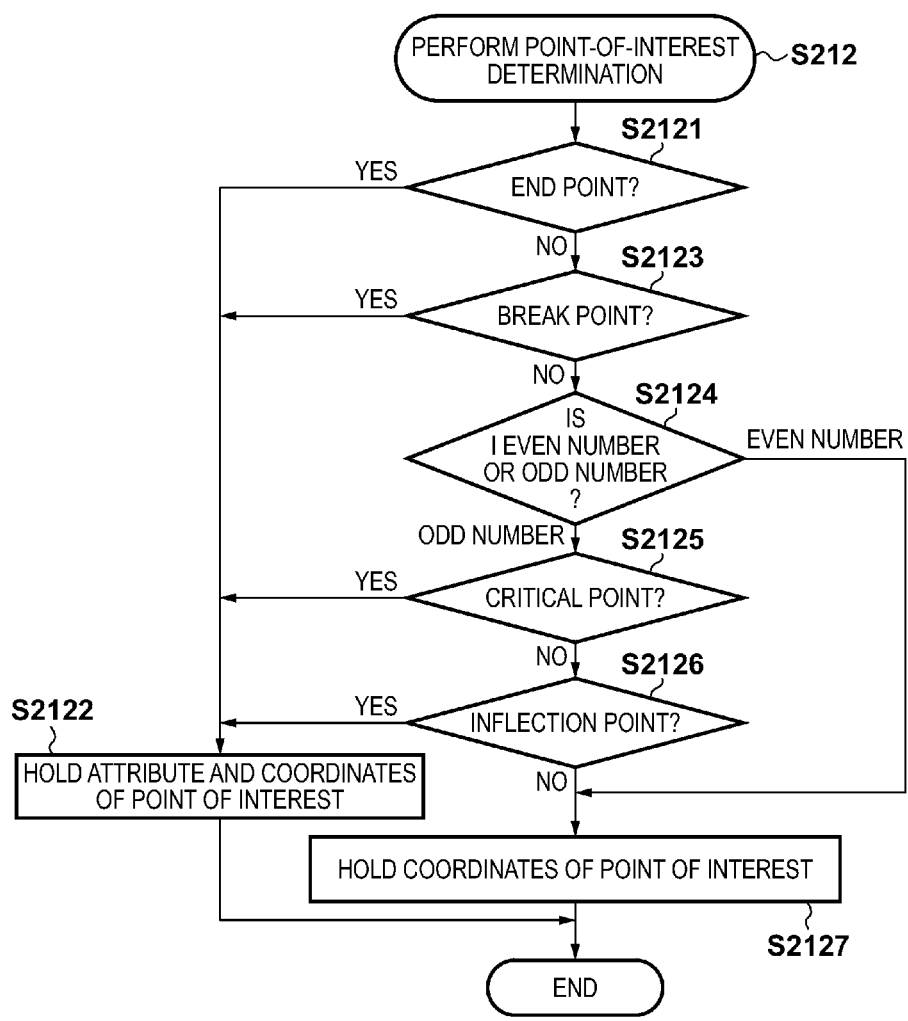

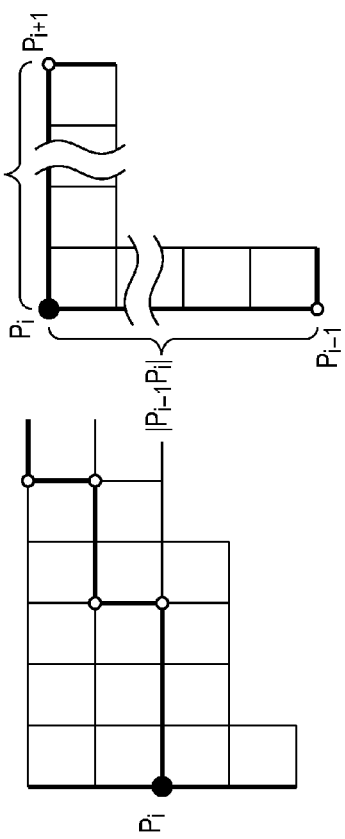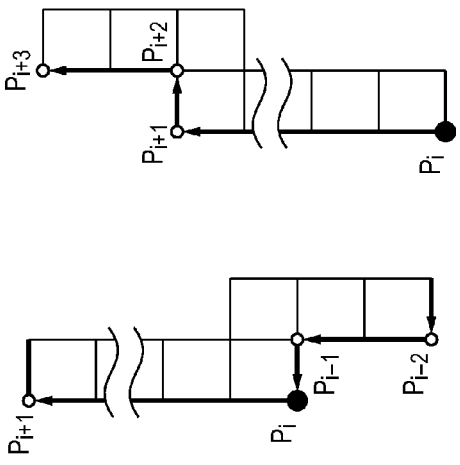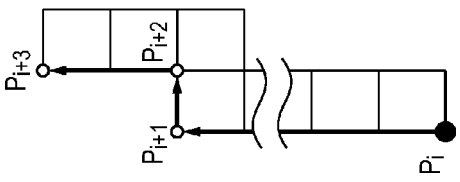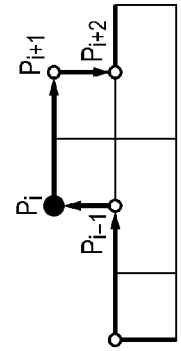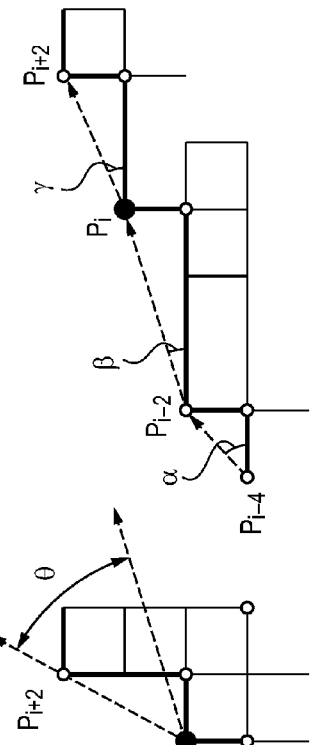

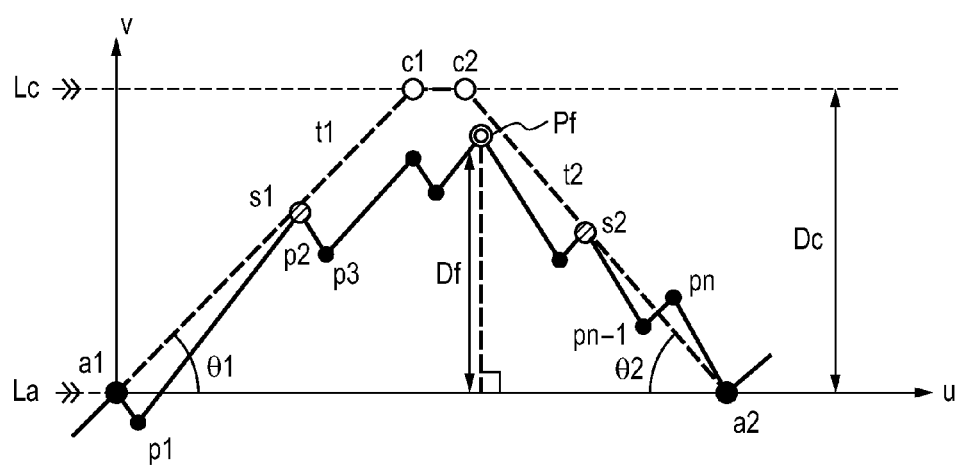
F I G. 13

F I G. 15
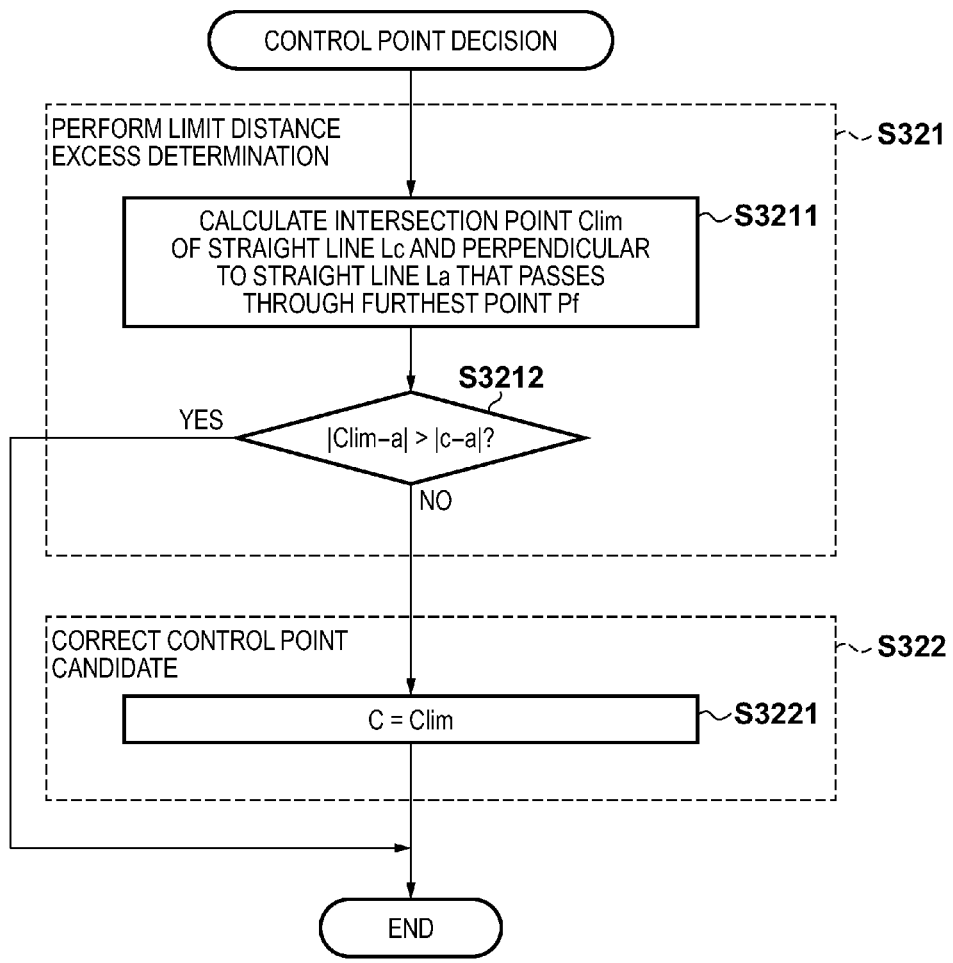

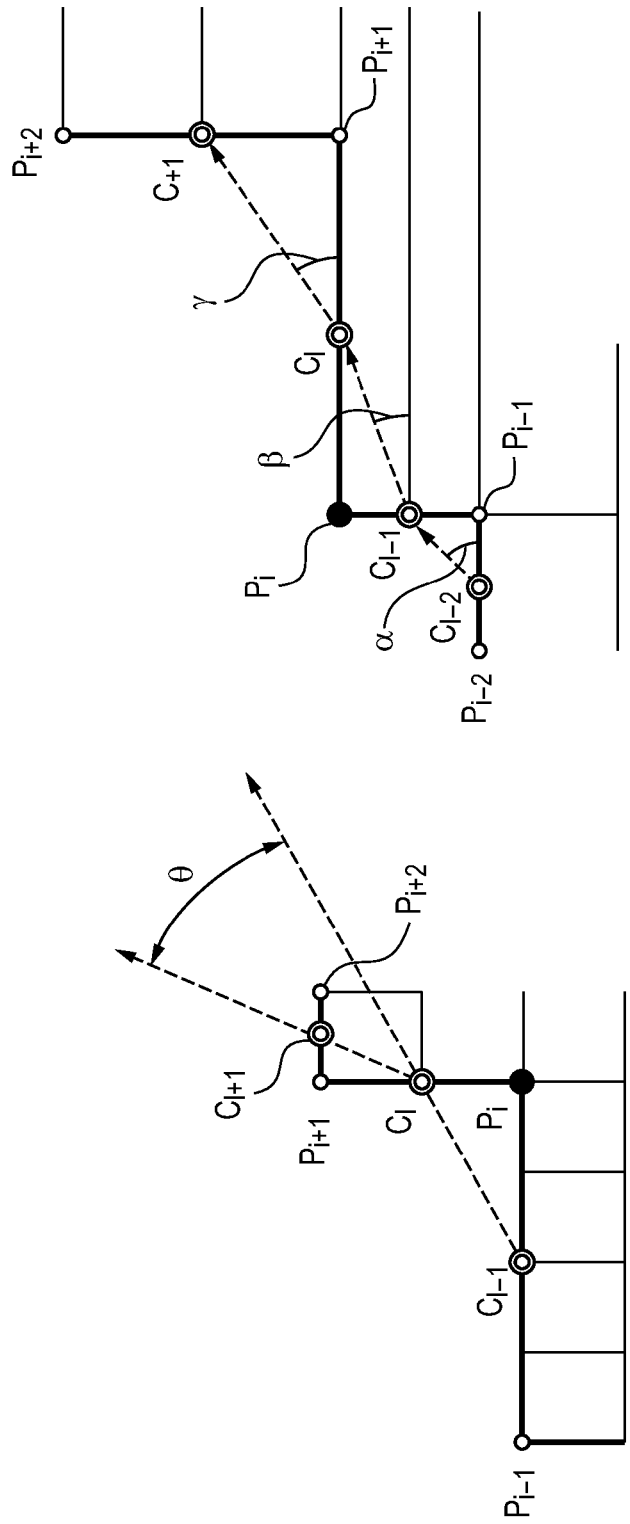

IMAGE PROCESSING METHOD, IMAGE PROCESSING APPARATUS, AND PROGRAM

BACKGROUND OF THE INVENTION

1. Field of the Invention

The present invention relates to image processing technology, and in particular to an image processing apparatus that converts a raster image into a vector image by extracting feature points from the raster image and performing function approximation, an image processing method, and a program.

2. Description of the Related Art

In recent years, devices with different resolutions such as a display and a printing device are used in combination, and the opportunity to display one image information piece at different resolutions is increasing. If an image suitable for a low resolution device is to be displayed or printed using a high resolution device, the output size will be small as is, and thus it is necessary to convert the image so as to have an original size by interpolating pixels, for instance. Even if the image whose size has been changed in this way is output using a high resolution device, the deterioration of image quality will be noticeable since it is not possible to take advantage of the resolution of the image. For this reason, vectorization technology for converting an image represented in the raster format into an image in the vector format independent of resolution is now necessary. Vectorization technology has been studied since earlier time, and vectorization techniques as described below have been disclosed.

In Japanese Patent Laid-Open No. 2005-310070, a coordinate point sequence showing a contour of a binary image is divided at dividing points that satisfy the conditions below.

Corner point 1: a point at which a change made by a vector that connects an adjacent point sequence forms an acute angle.

Corner point 2: points at both ends in a case in which the distance between successive points is greater than a threshold value.

Inflection point: a point at which the sign of the outer product of successive vectors changes.

A tangential direction is decided with respect to each dividing point that has been obtained in this way based on the coordinate point shape in the vicinity thereof, and approximation using a Bezier curve is performed with respect to the tangential directions.

However, a method for deciding a tangential direction is not specified in Japanese Patent Laid-Open No. 2005-310070. Further, a result of the approximation is fed back, and if it is determined that the precision is low, a dividing point is added, which may cause a decrease in the processing speed and extraction of an excessive dividing point.

In Japanese Patent Laid-Open No. 04-116690, a point at which the direction of a vector is reversed in the x or y direction and a point at which a curvature is large in a continuous curved section are assumed to be dividing points with respect to a coordinate point sequence that has been input. Then, a control point is decided using, as a tangential direction, the direction of an adjacent node between the dividing points, and thereafter, the decided control point is corrected in order to adjust the tangential direction of an adjacent integrated section.

However, in Japanese Patent Laid-Open No. 04-116690, the direction of an adjacent coordinate point is uniquely decided as the tangential direction, and the approximation precision may not be high if noise is included in an approximation section.

In Japanese Patent Laid-Open No. 04-287173, the input coordinate point sequence is partitioned into segments that can be represented with a cubic curve, and least square approximation is performed. Then, tangent lines at the starting point and the terminal point of a curved line segment obtained by the least square approximation are obtained by differentiation, thereby generating a Bezier curve, and thereafter the decided tangential directions are corrected in order to connect segments.

However, in Japanese Patent Laid-Open No. 04-287173, least square approximation is necessary as preprocessing of Bezier approximation processing, which may cause a decrease in the processing speed.

As described above, with the conventional vectorization method, the approximation precision with respect to raster data serving as the basis of vector data that has been obtained and the load of vectorization processing are in a trade-off relationship with each other, and thus it has been difficult to obtain vector data with high precision by simple processing.

SUMMARY OF THE INVENTION

The present invention has been conceived in view of the above problems, and allows curve approximation processing with high precision to be performed in a simple manner.

According to one aspect of the claimed invention, an image processing apparatus is provided with the configuration below. Specifically, an image processing apparatus comprises: an anchor point setting unit configured to set anchor points that partition a coordinate point sequence expressing a contour of an object in image data into a unit approximation section of a cubic Bezier curve; a control point candidate setting unit configured to set a first control point candidate and a second control point candidate in a quadrant in an orthogonal coordinate system in which with an anchor point that is of interest among the plurality of anchor points set by the anchor point setting unit serving as a first anchor point and an anchor point adjacent to the point of interest serving as a second anchor point, a first straight line that passes through two anchor points that are the first anchor point and the second anchor point serves as one of coordinate axes, and the first anchor point or the second anchor point serves as an origin, the quadrant having a point most distant from the first straight line in a coordinate point sequence in a unit approximation section that is partitioned by the two anchor points; and a control point decision unit configured to decide a first control point and a second control point such that a line segment that connects the first control point candidate and the first anchor point and a line segment between the second control point candidate and the second anchor point do not intersect with each other.

According to the present invention, the following can be realized.

Approximation can be performed without failure even in a section that includes noise.

Approximation processing can be performed in a simple manner without using feedback.

Excessive extraction of a dividing point can be prevented, and the amount of data can be reduced.

Thus, compared with conventional technology, approximation processing with higher precision can be performed in a simpler way.

Further features of the present invention will become apparent from the following description of exemplary embodiments with reference to the attached drawings.

BRIEF DESCRIPTION OF THE DRAWINGS

FIG. 3 is a flowchart showing main processing performed by the image processing apparatus according to Embodiment 1.

FIG. 8 is a flowchart showing anchor point candidate determination processing for a point of interest according to Embodiment 1.

FIGS. 10A to 10G are diagrams showing examples of anchor point candidate information extraction rules according to Embodiment 1.

FIG. 13 is an explanatory diagram with regard to control point candidate setting processing according to Embodiment 1.

FIG. 15 is a flowchart showing control point decision processing according to Embodiment 1.

FIGS. 21A and 21B are diagrams respectively showing an example of an extraction rule for extracting a critical point and that for an inflection point according to Embodiment 3.

DESCRIPTION OF THE EMBODIMENTS

Embodiment 1

Below is a description of embodiments of the present invention with reference to the attached drawings. However, it should be noted that the constituent elements described in the embodiments are to be taken as examples only, and the technical scope of the present invention is defined by the appended claims, and is not intended to be limited by the individual embodiments described below.

Example of Configuration of Image Processing apparatus

Figure 1:
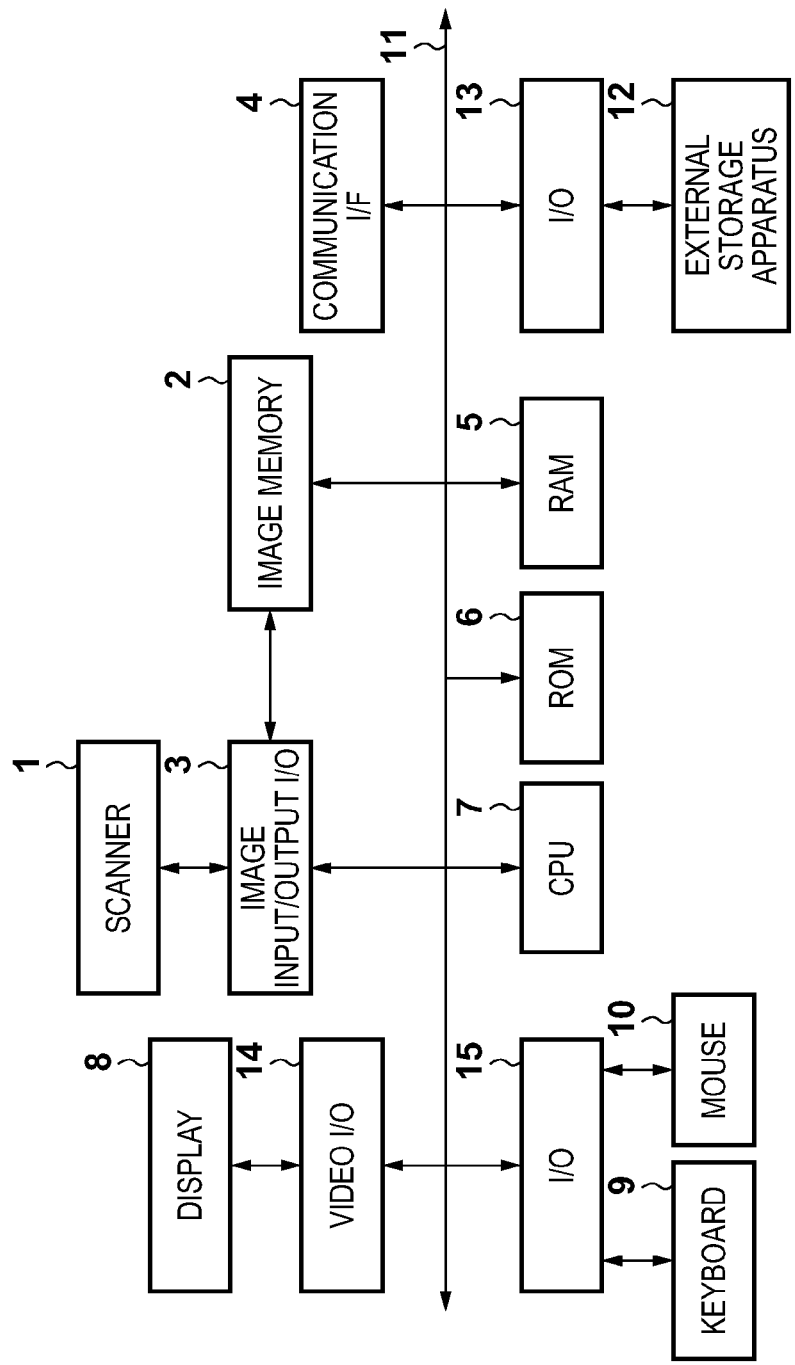
FIG. 1 is a block configuration diagram of an image processing apparatus according to an embodiment.

An example of a configuration of an image processing apparatus according to the present embodiment will be described with reference to the block diagram in FIG. 1. The image processing apparatus may be achieved by a general purpose computer or a peripheral apparatus such as a multi-functional copying machine (MFP). In FIG. 1, a CPU 7 is a processing unit that performs overall control of the apparatus. The procedure of a flowchart described in the present embodiment is realized by the CPU 7 executing a program that describes this procedure. A ROM 6 is a read only memory that stores programs and parameters that do not need to be changed. A RAM 5 is a random-access memory that temporarily stores a program and data supplied from an external apparatus or the like. A scanner 1 is a peripheral device for obtaining electronic image data by performing photoelectric scanning on a document and the like, and the scanner 1 and the main body of the image processing apparatus are connected by an image input/output I/O 3. An image memory 2 is an image memory that holds image data and the like that have been read with the scanner 1. An external storage apparatus 12 is an external storage apparatus that is fixedly installed and that includes a hard disk or a memory card, or an optical disk such as a flexible disk (FD) or a compact disc (CD), a magnetic card, an optical card, an IC card, a memory card, or the like, which is detachable. Further, an I/O 13 is an I/O interface that connects the external storage apparatus 12 to the main body of the image processing apparatus (for example, a computer). An I/O 15 is an interface with input devices that receive a user operation and input data, such as a keyboard 9 and a pointing device 10 such as a mouse. A video I/O 14 is an interface with a display monitor 8 for displaying data held by the image processing apparatus and supplied data. A communication I/F 4 is a communication interface for connection to a network circuit such as the Internet. A system bus 11 is a system bus that communicably connects the units 1 to 15.

Below is a description of the processing procedure that realizes the present invention based on a program executed by the CPU 7, with reference to the block diagram in FIG. 2 and the flowchart in FIG. 3.

Vectorization Processing Procedure

In the flowchart in FIG. 3, first, a coordinate point sequence is input in step S100. Here, first, upon the start of processing in step S110, raster image data including an image region to be processed is input. With regard to image input, image data read by the scanner 1 is input into the image memory 2 via the image input/output I/O 3. Further, an image including an image region to be processed may be input from outside the apparatus via the communication I/F 4. Alternatively, image data stored in the external storage apparatus 12 in advance may also be read via the I/O 13. The obtained input image data is held in the image memory 2. The above processing realizes an image input means 110 in FIG. 2.

Figure 4A:
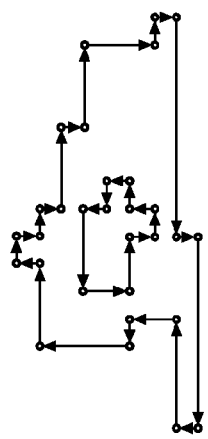
FIGS. 4A to 4E are diagrams showing examples of images and coordinate point sequences generated based on the images.

Next, coordinate point sequence extraction processing is performed on the read image data in step S120. The contour of an object in the image is represented by the approximation using horizontal and vertical vectors by this processing. One pixel of image data handled here is shown in FIG. 4A. As shown in FIG. 4A, one pixel in image data is handled as a square that has four vertexes, and is constituted by vertical and horizontal vectors that use the vertexes as the starting and terminal points. Note that a vertex here simply refers to a corner point, which differs from a "vertex" that serves as one of anchor points in vector data described later. Each of the four vectors that form one pixel will be referred to as a unit vector. If one pixel is handled as a square having four vertices, and the contour (outline) of an object (image object), which is a collection of pixels, is extracted, outline vectors made of horizontal and vertical vectors are extracted as outline data. For example, an object is an aggregation of pixels having a foreground color different from a background color. Generally, image data to be outlined (or vectorized) is often binary data, and it is easy to specify an object on which vectorization processing is to be performed. However, it is of course possible to vectorize even multi-value image data.

Figure 4B:
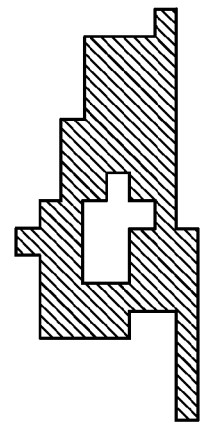
Figure 4C:
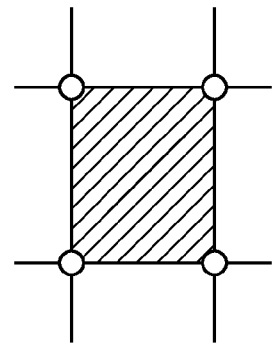

Outline vectors form a vector sequence in which a vertical vector and a horizontal vector alternately appear, and the terminal point of one vector serves as the starting point of a next vector. Accordingly, a vectorized outline can be represented using a coordinate point sequence in which the starting points (or terminal points) of successive vectors are arranged. Various methods for extracting a coordinate point sequence as described have been proposed, and if, for example, a coordinate point sequence extraction method disclosed in Japanese Patent No. 3026592 is used, it is possible to extract a coordinate point sequence more efficiently at higher speed than using the entire image. For example, a coordinate point sequence extracted from the image shown in FIG. 4B is a coordinate point sequence that constitutes a vector sequence in which horizontal vectors and vertical vectors are alternately arranged as shown in FIG. 4C.

Figure 4D:
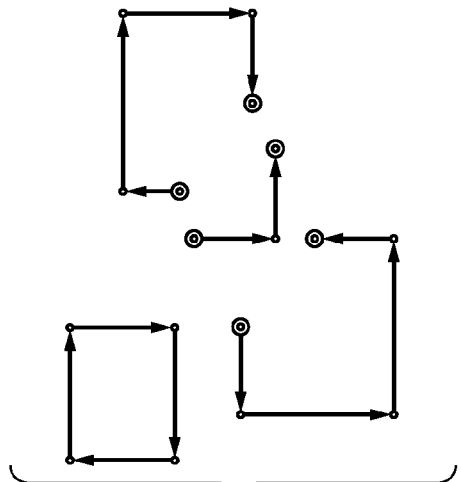
Figure 4E:
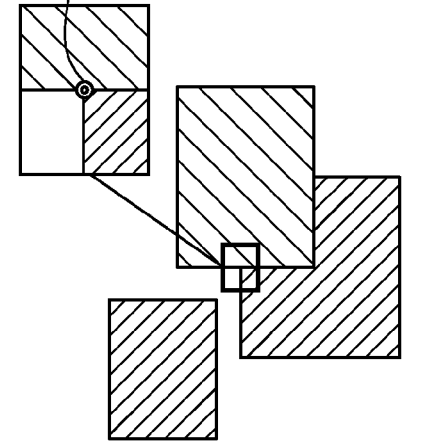

At this time, for example, a coordinate point sequence tracking method described in Japanese Patent Laid-Open No. 2006-031245 is applicable to a case in which read image data is constituted of a plurality of colors. Specifically, that method is a technique in which when there is an intersection point of color regions of three or more colors as shown in FIG. 4D, a coordinate point sequence is divided at that intersection point, and each is extracted as a different coordinate point sequence as shown in FIG. 4E. In the present embodiment, a coordinate point sequence whose starting and terminal points are at the same coordinates is referred to as a closed contour, and a coordinate point sequence whose starting and terminal points are at different coordinates is referred to as an open contour. The above processing realizes a coordinate point sequence extraction means 120 in FIG. 2. Further, a combination of steps S110 and S120 constitutes a coordinate point sequence input means 100 in FIG. 2. The coordinate point sequence extracted in step S100 is obtained by tracing a contour of an image in pixel units, and in the description below, the starting and terminal points of contour vectors of image data that have been extracted in step S100 and are to be vectorized are referred to as coordinate points, whereas a coordinate point sequence along the contour vectors is simply referred to as a coordinate point sequence.

Figure 5:
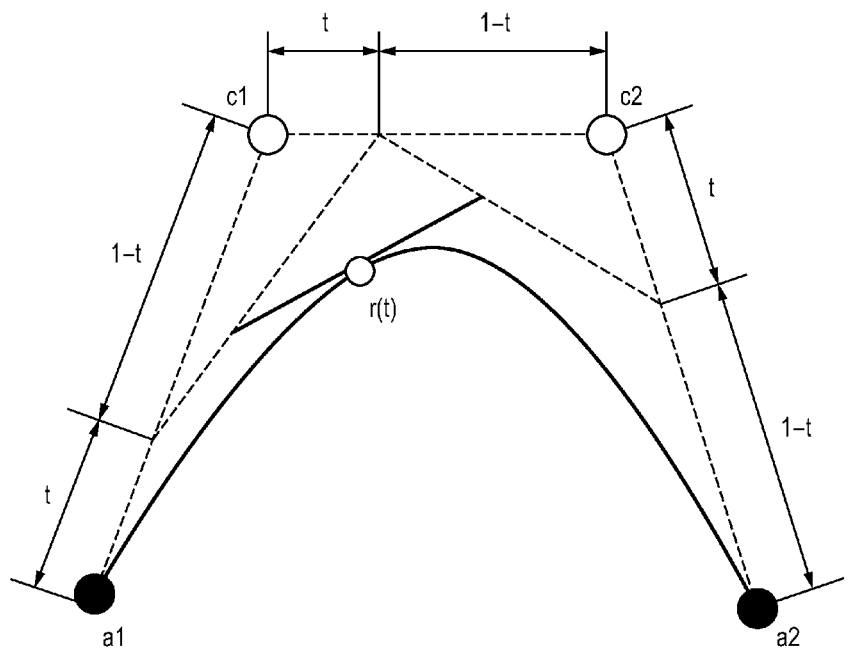
FIG. 5 is a diagram showing the concept of a Bezier curve.

Next, in steps S200 and S300, function approximation processing is performed on the extracted coordinate point sequence. In the present embodiment, a cubic Bezier curve is used as a function for replacement. A cubic Bezier curve is defined by two anchor points a1 and a2 and two control points c1 and c2, as shown in FIG. 5. A set of these anchor points and control points configures approximation data that approximates the contour of an image. In FIG. 5, black dots respectively represent the anchor points a1 and a2, and white dots respectively represent the control points c1 and c2. Further, assuming that a1, a2, c1, and c2 denote coordinate values, a cubic Bezier curve is defined by the expression below. Note that t is a parameter and is assumed to be $0 \leq t \leq 1$.

$$r(t)=(1-t)^3 a1+3t(1-t)^2 c1+3t^2(1-t)c2+t^3 a2$$

Therefore, in order to perform function approximation using a cubic Bezier curve, it is necessary to decide anchor points that appropriately partition the coordinate point sequence obtained in step S120 into a unit approximation section, and control points that appropriately approximate the shape of the coordinate point sequence that constitutes a portion between the anchor points. Below is a description of the flow of function approximation processing in the present embodiment. Note that a unit approximation section indicates a section that is approximated by one cubic Bezier curve. Note that since vector data is data that approximates an original object using horizontal and vertical vectors, function approximation processing can also be referred to as processing for restoring an original contour of the object.

Anchor Point Setting

First, anchor point setting processing is performed in step S200. The anchor point setting processing in the present embodiment is made up of two processes, namely, anchor point candidate information extraction processing in step S210 and anchor point decision processing in step S220 as shown in the flowchart in FIG. 3. Below is a description of anchor point candidate information extraction processing.

Anchor Point Candidate Decision

Figure 6:
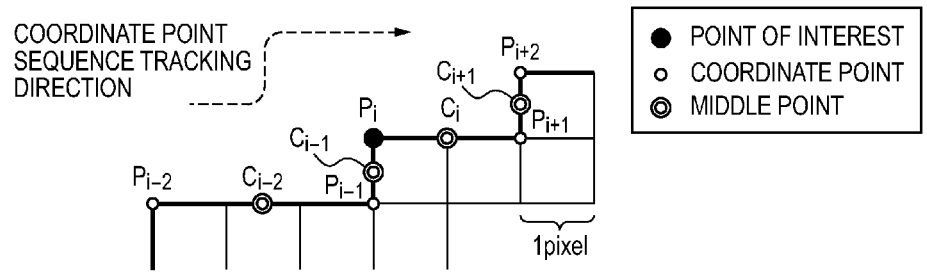
FIG. 6 is a diagram showing a point of interest, peripheral coordinate points, and middle points.

In anchor point candidate information extraction processing in step S210, a pattern formed by a point of interest and a coordinate point in the vicinity thereof in the coordinate point sequence extracted in step S120 is compared with a pattern decided in advance based on a plurality of extraction rules decided in advance. Then, if the patterns match, anchor point candidate information is output, assuming that the point of interest is a candidate for an anchor point. Here, as shown in FIG. 6, a point in the coordinate point sequence that is currently of interest is referred to as a point of interest $P_i$ (i=1, 2, and so on, n). Further, coordinate points in the opposite direction to the coordinate point sequence tracking direction viewed from the point of interest $P_i$ are assumed to be $P_{i-1}$, $P_{i-2}$, and so on, and coordinate points in the forward direction to the coordinate point sequence tracking direction are to be referred to as $P_{i+1}$, $P_{i+2}$, and so on. Further, anchor point candidate information includes coordinates of a contour point extracted as a candidate for an anchor point and an attribute that indicates pattern characteristics in the vicinity of the contour point $P_i$ serving as an anchor point candidate. Further, middle point coordinates in FIG. 6 will be described below. The points serving as anchor point candidates are an end point, a break point, a critical point, an inflection point, a straight line holding point, and a vertex that each satisfy prescribed conditions, and it is determined in S210 whether or not a point of interest corresponds to such a point. Note that a vertex is a vertex of the contour of an object, and corresponds to the maximal value or the minimal value of a function. Further, an inflection point can be said to be a point at which the sign of the curvature of the contour of an object changes. A critical point is a point at which the contour of an object is bent at an angle equal to or greater than a fixed angle. A break point is a point at which the contour of an object is bent at right angles. A straight line holding point is a point, in the contour of an object, serving as the starting point of a straight line in the same direction as a vertical or horizontal vector that appears when raster data is simply vectorized. Further, this side is referred to as a straight line holding side. Note that the contour of an object here indicates the contour of the shape that an object originally has, rather than a stepped contour obtained by connecting a coordinate point sequence using vertical and horizontal vectors, in other words, the contour generated by digitization of an image. Then, the contour that an object originally has is decided by referring to the arrangement of coordinate point sequences, and the above points are specified.

Figure 7:
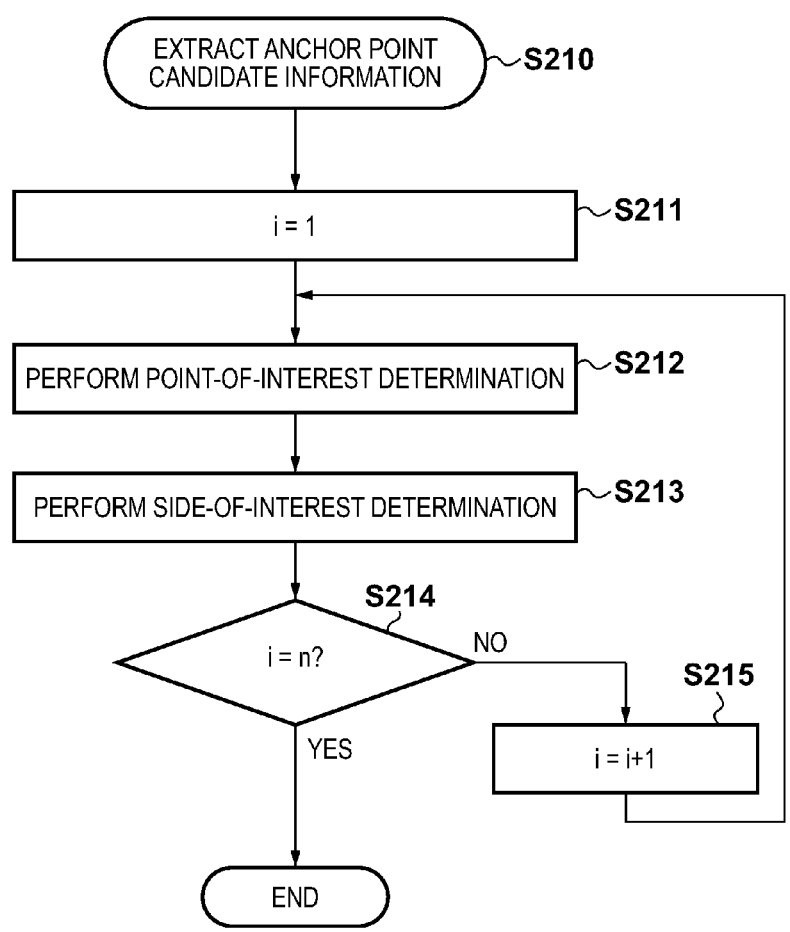
FIG. 7 is a flowchart showing anchor point candidate information extraction processing according to Embodiment 1.

FIG. 7 shows the flow of anchor point candidate information extraction processing performed in step S210. First, in step S211, the initial point of a coordinate point sequence to be tracked is searched for, and the corresponding coordinate point is assumed to be a first point of interest. Next, in step S212, it is determined whether or not the point of interest $P_i$ itself is to be an anchor point candidate. FIG. 8 shows a detailed processing flow thereof.

First, it is determined in step S2121 whether the point of interest is an end point. An end point is a point $P_i$ with no coordinate point existing before or after the coordinate point of interest $P_i$ of an open contour, as shown in FIG. 10A. Specifically, a point only serving as either the starting point or the terminal point of a contour vector is an end point. If it is determined that the point of interest $P_i$ is an end point, the processing proceeds to step S2122, where the coordinates of the point of interest $P_i$ itself and the attribute "end point" are held in association with each other, and processing ends. The extracted coordinate point sequence can be represented as a collection of coordinate points that constitutes a coordinate point sequence even if the sequence forms an open contour or a closed contour. Then, in the processing for extracting a coordinate point sequence, if it is assumed that an end point of an open contour is disposed at the beginning or end of the coordinate point sequence, determination as to whether or not a point is an end point can be performed as follows, for example. First, if information indicating that a sequence is an open contour is added to the coordinate point sequence extracted in the extraction processing, in a case in which it is determined that the sequence is an open contour by referring to that information, it can be determined that the coordinate points at the beginning and at the end are end points. Further, in a case in which it is not indicated that the sequence is an open contour, if a vector whose starting point is at the end coordinate point and whose terminal point is at the beginning coordinate point is not either a vertical vector or a horizontal vector, it can be determined that the sequence is an open contour. Further, even in a case in which that vector is a vertical vector or a horizontal vector, if either one of or both of vectors before and after that vector are vectors in the same direction, it can be determined that the sequence is an open contour. If the sequence is an open contour, the coordinate points at the beginning and at the end will be end points. Of course, this method is only an example of a determination method.

If it is determined in step S2121 that the point is not an end point, the processing proceeds to break point determination in step S2123. As shown in FIG. 10B, a break point is assumed to be a point of interest in a case in which using coordinates $P_{i-1}$ and $P_{i+1}$ as reference points, the lengths of a side $P_{i-1}P_i$ and a side $P_iP_{i+1}$ which are formed by the point of interest Pi and the reference points, are both equal to or longer than a threshold value T1. The length of a side here indicates the pixel length (the number of pixels) between coordinates. At this time, the threshold value T1 may be fixedly decided or may be variable in consideration of the size of an image. In the present embodiment, with C denoting the length of the outer circumference of the circumscribed rectangle of a coordinate point sequence, it is assumed that the value T1=2+C/300. Note that the threshold value T1 is limited in the range 2≤T1≤6. Specifically, T1=2 if 2+C/300 is less than 2, and T1=6 if 2+C/300 exceeds 6. If it is determined that the point is a break point, the processing proceeds to step S2122, where the coordinates of the point of interest $P_i$ itself and the attribute "break point" are held in association with each other, and the processing ends.

If it is determined in step S2123 that the point is not a break point, the processing proceeds to step S2124. In step S2124, it is determined that the point that is currently of interest is an odd-numbered point or an even-numbered point. If it is determined here that the point is an even-numbered point, the processing proceeds to step S2127, where only the coordinates of the point of interest $P_i$ itself are held, and processing directly ends. If it is determined that the point is an odd-numbered point, the processing proceeds to step S2125.

Critical point determination is performed in step S2125. A critical point is a point of interest in a case in which using coordinates $P_{i-2}$ and $P_{i+2}$ as reference points as shown in FIG. 10F, and an angle θ formed by a vector $P_{i-2}P_i$ and a vector $P_iP_{i+2}$ is calculated, and the angle θ is equal to or greater than a threshold value T2. In the present embodiment, the threshold value T2 is set to 25°. If it is determined that the point is a critical point, the processing proceeds to step S2122, where the coordinates of the point of interest $P_i$ itself and the attribute "critical point" are held, and processing ends.

If it is determined in step S2125 that the point is not a critical point, the processing proceeds to inflection point determination in step S2126. For an inflection point, coordinates $P_{i-4}$, $P_{i-2}$, and $P_{i+2}$ are used as reference points as shown in FIG. 10G. Then, gradient α of a line segment $P_{i-4}P_{i-2}$, gradient β of a line segment $P_{i-2}P_i$, and gradient γ of a line segment $P_iP_{i+2}$ are calculated, and β−α and γ−β that each show the amount of change in the gradient are calculated. Then, a point at which the positive/negative signs of the amounts of change in the gradient are switched, in other words, a coordinate point at which the signs of the amounts of change in the gradient of the vectors are reversed is assumed to be an inflection point. However, if the absolute value of the amount of change in the gradient β−α is equal to or less than a threshold value T3, until the absolute value of β−α takes a value greater than the value of the threshold value T3, determination is performed while changing the line segment having the gradient α so as to be $P_{i-6}P_{i-4}$, $P_{i-8}P_{i-6}$, and so on. In the present embodiment, the threshold value T3 is set to $1.0 \times 10^{-7}$. If it is determined that a point is an inflection point, the processing proceeds to step S2122, where the coordinates of the point of interest $P_i$ itself and the attribute "inflection point" are held in association with each other, and processing ends directly.

If it is determined in step S2126 that a point is not an inflection point, the processing proceeds to step S2127, where only the coordinates of the point of interest $P_i$ itself are held, and processing ends directly.

Figure 9:
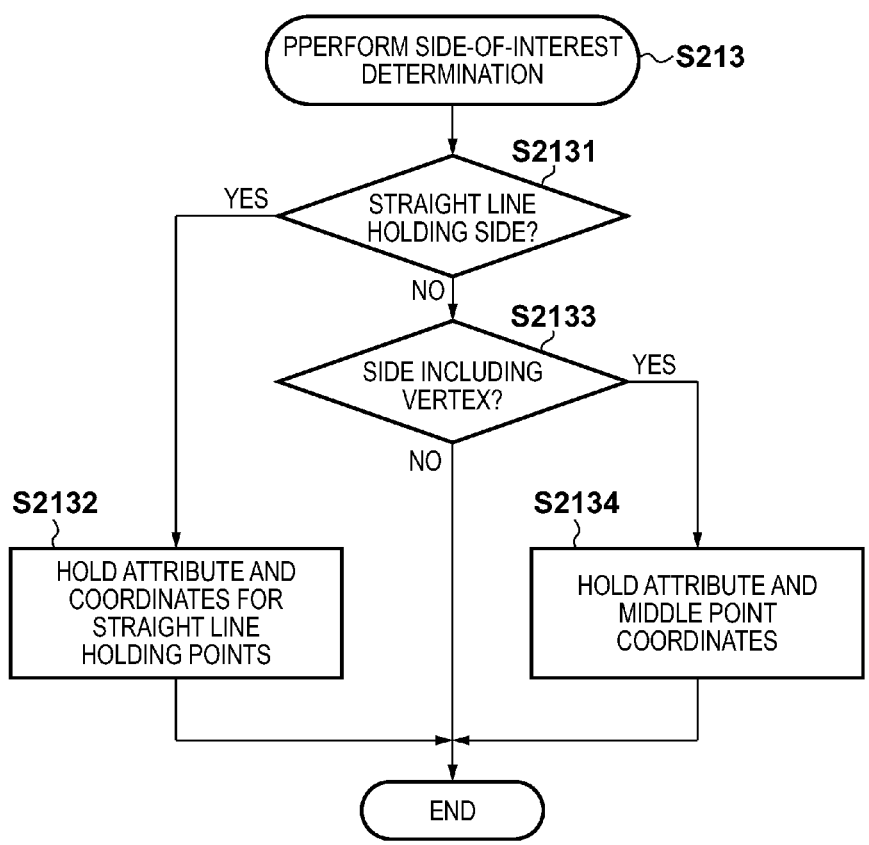
FIG. 9 is a flowchart showing anchor point candidate determination processing on a side of interest according to Embodiment 1.

Determination in step S212 as to whether the point of interest $P_i$ itself is an anchor point candidate (anchor point candidate determination) has ended to this point. Next, processing proceeds to step S213, where it is determined whether or not an anchor point candidate is to be set on a side of interest $P_iP_{i+1}$. Here, the side of interest represents a side that connects the point of interest $P_i$ and a coordinate point $P_{i+1}$ that exists thereafter. Here, if an anchor point candidate is extracted, the coordinates thereof are on the side of interest, and thus the candidate is added to the coordinate point sequence $P_iP_{i+1}$ extracted in step S120. FIG. 9 shows a detailed processing flow thereof.

First, in step S2131, it is determined whether or not the side of interest $P_iP_{i+1}$ is a straight line holding side. In the determination of a straight line holding side, as shown in FIGS. 10C and 10D, the coordinates $P_{i-2}$, $P_{i-1}$, and $P_{i-1}$ or the coordinates $P_{i+1}$, $P_{i+2}$, and $P_{i+3}$ are assumed to be reference points. Then, next, $|P_{i-2}P_{i-1}|$ and $|P_iP_{i+1}|$ indicating the lengths of vectors $P_{i-2}P_{i-1}$ and $P_iP_{i-1}$, or $|P_iP_{i+1}|$ and $|P_{i+2}P_{i+3}|$ indicating the lengths of vectors $P_iP_{i-1}$ and $P_{i+2}P_{i+3}$ are each calculated. Then, it is determined that a side in which $|P_iP_{i+1}|$ is equal to or longer than the length obtained by multiplying $|P_{i-2}P_{i-1}|$ by T4, or $|P_iP_{i+1}|$ is equal to or longer than the length obtained by multiplying $|P_{i+2}P_{i+3}|$ by T4, and both vector directions are the same is a straight line holding side. If it is determined that the side of interest is a straight line holding side, the processing proceeds to step S2132, where two points that are respectively separated from the coordinates $P_i$ and $P_{i-1}$ by distance $|P_iP_{i+1}|/T5$ are decided on the side of interest $P_iP_{i-1}$, the attribute thereof is set as "straight line holding points", the decided straight line holding points are held in association with the attribute, and processing ends. At this time, the coefficients T4 and T5 may be decided uniquely, or may be variable in consideration of the size of an image. In the present embodiment, the coefficient T4 is 10, and the coefficient T5 is 5.

If it is determined in step S2131 that the side of interest $P_iP_{i+1}$ is not a straight line holding side, the processing proceeds to determine whether a side includes a vertex in step S2133. A side including a vertex is a side where using coordinates $P_{i-1}$, $P_{i+1}$, and $P_{i+2}$ as reference points, a vector $P_{i-1}P_i$ and a vector $P_{i+1}P_{i+2}$ are in opposite directions, as shown in FIG. 10E. If it is determined that the side of interest $P_iP_{i+1}$ is a side including a vertex, the processing proceeds to step S2134, where middle point coordinates of the line segment $P_iP_{i+1}$ and the attribute "vertex" associated with those coordinates are held, and processing ends. Processing ends directly in step S2133, if it is determined that the side of interest $P_iP_{i+1}$ is not a side including a vertex.

Anchor point candidate determination on the side of interest $P_iP_{i+1}$ in step S213 has ended to this point. Next, in step S214, it is determined whether or not the current point of interest is the terminal point, namely, the last point of the coordinate point sequence that is being tracked. If it is determined that the point is not a terminal point, the point of interest is shifted to the next point on the coordinate point sequence in step S215, and the processing proceeds to step S212 again. The anchor point candidate information extraction processing ends if it is determined that the point is a terminal point.

Anchor Point Decision

Next, anchor point decision processing is performed in step S220 based on the extracted anchor point candidate information. The attribute of an anchor point candidate is stored in association with a contour point, and thus it can be determined, based on the attribute thereof, that the point is an anchor point candidate. Here, the coordinate point sequence extracted in step S210 is referred to as $Q_j$ (j=1, 2, and so on, m). Then, coordinate points $Q_{j-2}$, $Q_{j-1}$, $Q_{j+1}$, and $Q_{j+2}$ that are located before/after a point of interest $Q_j$ are used as reference points. Then, if the reference points include anchor point candidates, it is decided, according to the attribute of each anchor point candidate, whether or not to delete the anchor point candidate of interest. Further, deletion here indicates that the attribute stored in association with the coordinates extracted as an anchor point candidate in step S210 is deleted, so as to return the state thereof to the state of a coordinate point that is not an anchor point candidate. However, the attributes "vertex" and "straight line holding point" each indicate a point newly added on a side, and thus if such attributes are deleted, not only the attributes but also the coordinates associated therewith are deleted in order to return the state to an original state of a coordinate point sequence extracted in step S120.

Figure 11:
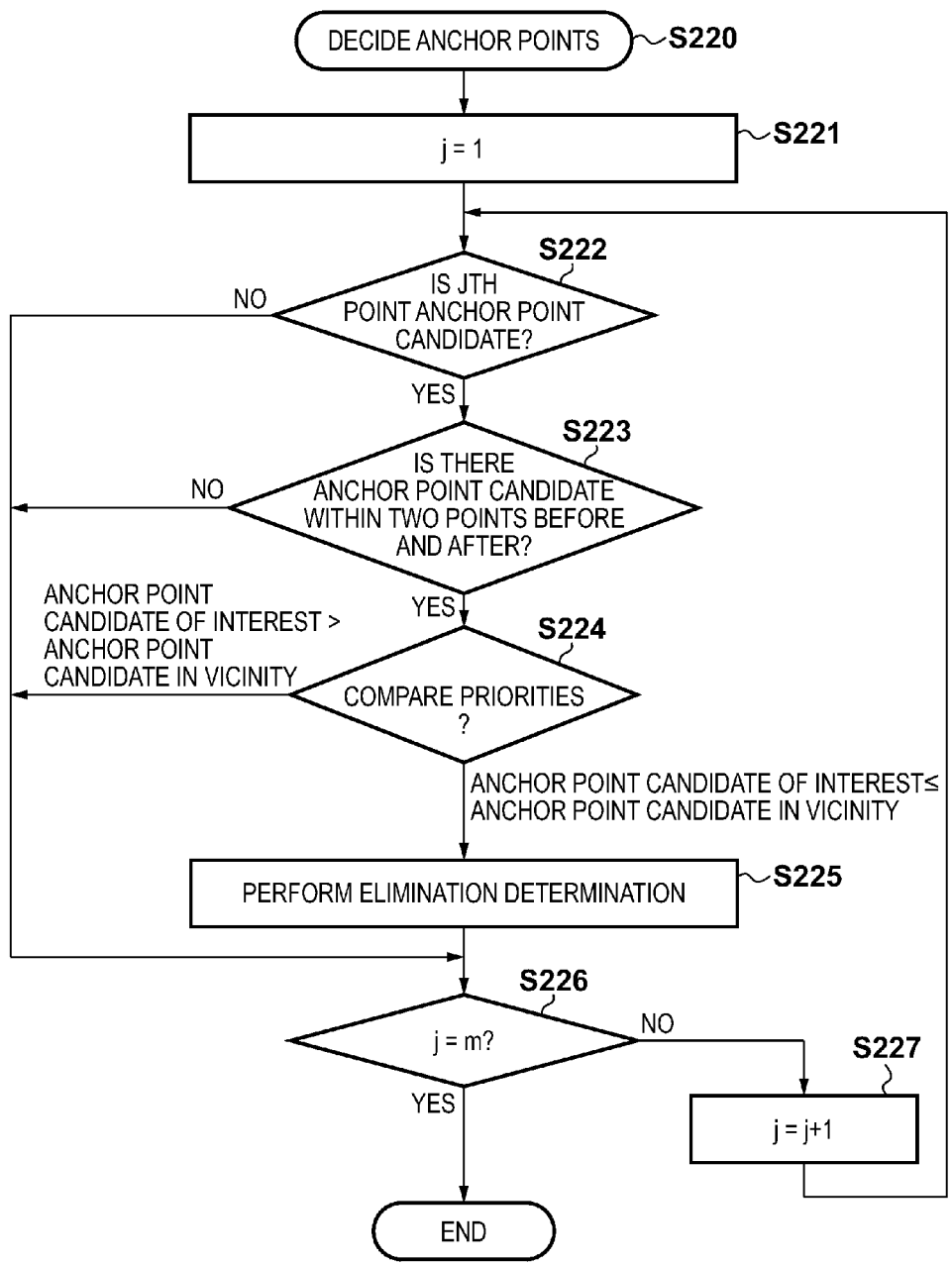
FIG. 11 is a flowchart showing anchor point decision processing according to Embodiment 1.

FIG. 11 shows a detailed flow of anchor point decision processing performed in step S220. First, in step S221, an initial point of a coordinate point sequence to be tracked is searched for, a coordinate point corresponding thereto is assumed to be a point of interest $Q_j$, and the processing proceeds to step S222.

In step S222, it is determined whether or not the point of interest $Q_j$ is a point extracted as an anchor point candidate. If the point of interest $Q_j$ is not a point extracted as an anchor point candidate, the processing proceeds to step S226. Details of step S226 will be described below. If the point of interest $Q_j$ is a point extracted as an anchor point candidate, the processing proceeds to step S223. However, in the present embodiment, an end point is not deleted from among anchor point candidates, and thus if it is determined in S222 that the point of interest is an end point, the processing branches to step S226.

In step S223, no more than two points before and after the anchor point candidate of interest $Q_j$ ($Q_{j-2}$, $Q_{j-1}$, $Q_{j+1}$, $Q_{j+2}$) are used as reference points, and it is determined whether or not the reference points include an anchor point candidate. If an anchor point candidate does not exist among the reference points, the processing proceeds to step S226. If an anchor point candidate exists among the reference points, the processing proceeds to step S224.

In step S224, priorities of anchor point candidates are compared. Here, priorities of anchor point candidates depend on the attribute in anchor point candidate information. In the present embodiment, priorities of anchor point candidates are decided in advance, specifically, "break point", "straight line holding point", "vertex", "critical point", and "inflection point" in descending order. Further, an "end point" is a point necessary for a process of connecting coordinate point sequences after approximation processing has ended, and thus is not to be deleted as an exception. Thus, the priority of "end point" is the highest in order, which is higher than "break point". If the priority of the anchor point candidate of interest $Q_j$ is higher than the priority of an anchor point candidate that exists among the reference points, the processing proceeds to step S226. If the priority of the anchor point candidate of interest $Q_j$ is equal to or lower than the priority of an anchor point candidate that exists among the reference points, the processing proceeds to step S225.

Figure 12:
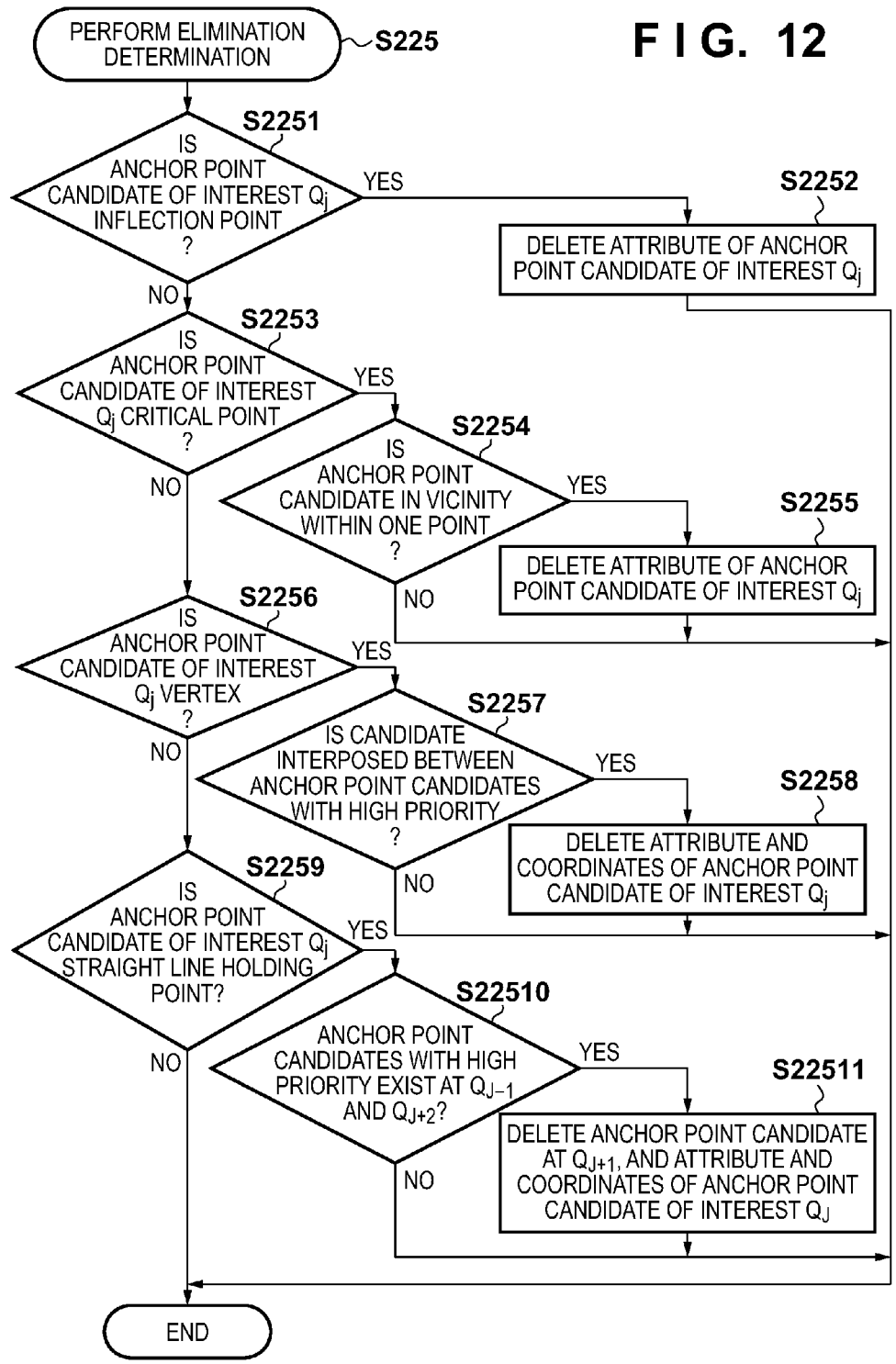
FIG. 12 is a flowchart showing elimination determination processing according to Embodiment 1.

Anchor point candidate elimination processing is performed in step S225. FIG. 12 shows a detailed flow of elimination processing. First, in step S2251, it is determined whether or not the attribute of the anchor point candidate of interest $Q_j$ is "inflection point".

If the attribute of the anchor point candidate of interest $Q_j$ is "inflection point", the processing proceeds to step S2252, where the attribute of the anchor point candidate of interest $Q_j$ is deleted, and processing ends directly. If the attribute of the anchor point candidate of interest $Q_j$ is not "inflection point", the processing proceeds to step S2253.

In step S2253, it is determined whether or not the attribute of the anchor point candidate of interest $Q_j$ is "critical point". If the attribute of the anchor point candidate of interest $Q_j$ is "critical point", the processing proceeds to step S2254, where it is determined whether or not the anchor point candidate among the reference points is an adjacent reference point $Q_{j-1}$ or $Q_{j+1}$. Then, if the candidate is the adjacent reference point $Q_{j-1}$ or $Q_{j+1}$, the processing proceeds to step S2255, where the attribute of the anchor point candidate of interest $Q_j$ is deleted, and processing ends directly. If the candidate is a coordinate point that is not adjacent, processing ends directly. If the attribute of the anchor point candidate of interest $Q_j$ is not "critical point", the processing proceeds to step S2256.

In step S2256, it is determined whether or not the attribute of the anchor point candidate of interest $Q_j$ is "vertex". If the attribute of the anchor point candidate of interest $Q_j$ is "vertex", the processing proceeds to step S2257, where it is determined whether or not anchor point candidates with high priority exist at both adjacent reference points $Q_{j-1}$ and $Q_{j+1}$.

Specifically, it is determined whether the candidate is interposed between anchor point candidates with high priority. Then, if anchor point candidates exist at both adjacent reference points $Q_{j-1}$ and $Q_{j+1}$, the processing proceeds to step S2258, where the attribute and the coordinates of the anchor point candidate of interest $Q_j$ are deleted, and processing ends directly. If anchor point candidates do not exist at both adjacent reference points $Q_{j-1}$ and $Q_{j+1}$, processing ends directly. If the attribute of the anchor point candidate of interest $Q_j$ is not "vertex", the processing proceeds to step S2259.

In step S2259, it is determined whether or not the attribute of the anchor point candidate of interest $Q_j$ is "straight line holding point". If the attribute of anchor point candidate of interest $Q_j$ is a "straight line holding point", the attribute of the reference point $Q_{j+1}$ is always the same "straight line holding point". Thus, next, processing proceeds to step S22510, where it is determined whether or not anchor point candidates with high priority exist at both the reference points $Q_{j-1}$ and $Q_{j+2}$. If anchor point candidates with high priority exist at both the reference points $Q_{j-1}$ and $Q_{j+2}$, the processing proceeds to step S22511, where the anchor point candidate that exists at the reference point $Q_{j+1}$, and the attribute and the coordinates of the anchor point candidate of interest $Q_j$ are deleted, and processing ends directly. If anchor point candidates with high priority do not exist at both the reference points $Q_{j-1}$ and $Q_{j+2}$, processing ends directly. Processing ends if the attribute of the anchor point candidate of interest $Q_j$ is not "straight line holding point".

Determination as to whether or not to eliminate anchor point candidates of interest has ended so far. Next, in step S226, it is determined whether or not the current point of interest is a terminal point of the coordinate point sequence that is being tracked. If it is determined that the point is not a terminal point, the point of interest is shifted to the next point on the coordinate point sequence in step S227, and the processing proceeds to step S222 again. The anchor point decision processing ends if it is determined that the point is a terminal point.

Anchor point candidates remaining at this point in time are selected anchor points. In a unit approximation section that is partitioned by anchor points decided in this way, in an orthogonal coordinate system in which a straight line that passes through the anchor points (which is also referred to as a first straight line) is assumed to be a coordinate axis, and one of the anchor points is assumed to be the origin, the number of maximal values or minimal values (in other words, peaks) of a contour approximated using a coordinate point sequence will be one or less. Note that the contour approximated using a coordinate point sequence here is an original contour of an object specified based on the arrangement of the coordinate point sequence. In other words, since the original contour of the object is approximated by vertical and horizontal vectors, unevenness formed by unit vectors (vectors corresponding to those having 1-pixel length) is an error due to approximation, and is not regarded as the minimal value or the maximal value.

Figure 2:
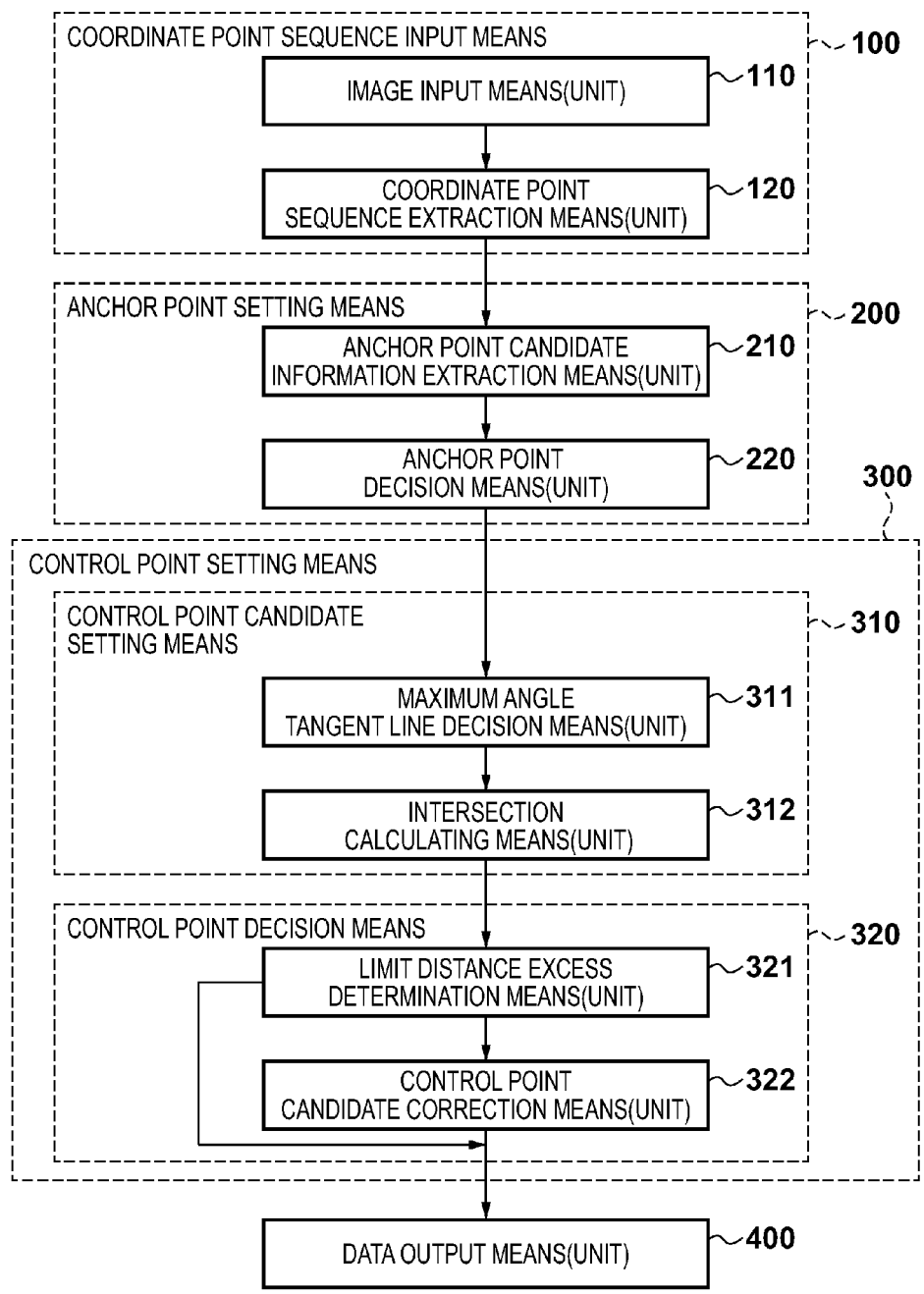
FIG. 2 is a block configuration diagram showing main processing performed by an image processing apparatus according to Embodiment 1.

As described above, anchor point candidate information extraction processing in step S210 and anchor point decision processing in step S220 realize an anchor point candidate information extraction means 210 and a anchor point decision means 220, respectively in an anchor point setting means 200 in FIG. 2.

Control Point Setting

Next, control point setting processing is performed in step S300. Control point setting processing in the present embodiment is constituted by control point candidate setting processing in step S310 and control point decision processing in step S320. Control point candidate setting processing is made up of maximum angle tangent line decision processing in step S311 and intersection point calculation processing in step S312. Further, control point decision processing is made up of limit distance excess determination processing in step S321 and control point candidate correction processing in step S322.

First, below is a description of control point candidate setting processing in step S310. FIG. 13 is an explanatory diagram of control point candidate setting processing in one unit approximation section that is partitioned by anchor points obtained in step S200. Here, two anchor points that partition a coordinate point sequence into a unit approximation section are assumed to be a1 and a2 for convenience. In control point candidate setting processing, control points for approximating a unit approximation section that is partitioned by anchor points obtained in step S200 with a curved line are temporarily decided.

Here, approximation using a cubic Bezier curve is described. First, it is assumed that a straight line Lc that connects control points to be obtained from now on is parallel to a straight line La that connects the anchor points. Then, a point that is most distant from the line segment La in a coordinate point sequence in the unit approximation section that is partitioned by the anchor points is assumed to be Pf, and the distance thereof is assumed to be Df. At this time, if the longest distance at the cubic Bezier curve after approximation and in the direction perpendicular to the straight line La is assumed to have the same value as that of the distance Df, a distance Dc between the straight line La and the straight line Lc has the relationship Dc=4/3Df. Accordingly, the straight line Lc is uniquely decided.

Next, by deciding tangent lines t1 and t2 corresponding to the anchor points and calculating each of intersection points c1 and c2 of the straight line Lc and the tangent lines t1 and t2, control point candidates c1 and c2 corresponding to the anchor points (which are also respectively referred to as a first control point candidate and a second control point candidate) can be obtained. Below is a detailed description of the content of processes.

Figure 14:
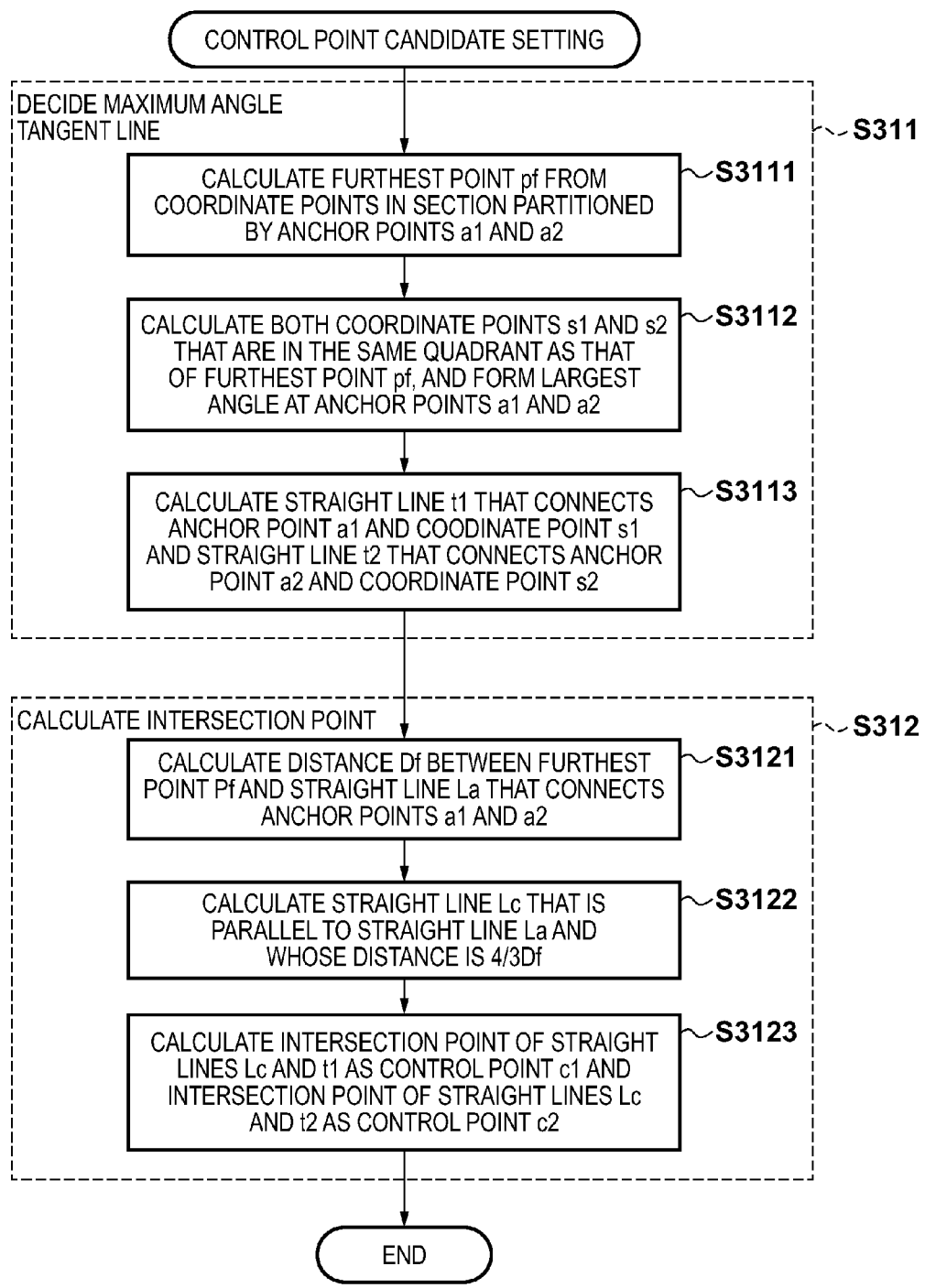
FIG. 14 is a flowchart showing the control point candidate setting processing according to Embodiment 1.

FIG. 14 shows a detailed flow of control point candidate setting processing in the present embodiment. First, maximum angle tangent line decision processing in step S311 will be described.

Here, anchor points are a1 and a2, the number of coordinate points in a unit approximation section is set to n, and a coordinate point sequence is defined as pk (k=1, 2, and so on, n). In step S3111, the furthest point Pf in the coordinate point sequence pk is extracted.

Next, in step S3112, an orthogonal coordinate system is defined in which the straight line La that connects the anchor points is assumed to be a u axis, and the direction perpendicular to the u axis with the anchor point a1 serving as the origin is assumed to be a v axis, as shown in FIG. 13. Then, in this orthogonal coordinate system, a point that is in the same quadrant as that of the furthest point Pf and at which an angle $\theta 1$ formed by the line La and a straight line a1pk is the maximum is decided as a reference point s1, and a point at which an angle $\theta 2$ formed by the straight line La and a straight line a2pk is the maximum is decided as a reference point s2. At this time, a point nearest to each anchor point is not decided as a reference point for smoothness. Specifically, coordinate points p1 and pn will not be extracted as reference points. Further, although not shown this time, the number of coordinate points n that are included in the unit approximation section is less than the number necessary for obtaining the furthest point Pf and the reference points s1 and s2, exceptional processing is performed in which control points are not added, assuming that the section between the anchor points is a straight line section, and processing proceeds to data output processing in step S400 directly.

Next, in step S3113, a straight line that connects the anchor point a1 and the reference point s1 decided in step S3112 is calculated as a tangent line t1, and a straight line that connects the anchor point a2 and the reference point s2 decided in step S3112 is calculated as a tangent line t2, and maximum angle tangent line decision processing ends.

Decision of a tangent line at each anchor point has completed so far. The above processing realizes a maximum angle tangent line decision means 311 in FIG. 2. Next, intersection point calculation processing is performed in step S312.

Here, first, in step S3121, a point Pf that is most distant from the line segment La in the coordinate point sequence in the unit approximation section is decided, the distance thereof. Df is calculated, and the processing proceeds to step S3122. In step S3122, a straight line that is parallel to the straight line La that connects the anchor points a1 and a2 and whose distance from the straight line La is 4/3Df is calculated as the straight line Lc, and the processing proceeds to step S3123. In step S3123, intersection points of the line segment Lc and the tangent lines t1 and t2 at the anchor points a1 and a2 decided in step S200 are calculated, the calculated points are respectively decided as the control point candidates c1 and c2, and intersection point calculation processing ends. A Bezier curve according to the anchor points can be defined by storing the coordinates of the decided control point candidates in association with the anchor points used for the decision of the control points. The above is processing performed with respect to a pair of anchor points, and executed with respect to a pair of anchor points on a contour.

Decision of control point candidates has been completed to this point. The above processing realizes an intersection calculating means 312 in FIG. 2, and a combination of steps S311 and S312 realizes a control point candidate setting means 310.

Next, control point decision processing in step S320 is performed. FIG. 15 shows a detailed flow of control point decision processing. Here, in step S321, it is determined whether or not the position of a control point candidate is in a section defined by a limit distance. Then, if the position is in the section defined by the limit distance, the control point candidate is decided as a control point as is, and if the position is outside the section defined by the limit distance, a point obtained by correcting the position of the control point candidate is decided as a control point in step S322. Below is a description of details thereof.

First, limit distance excess determination processing is performed in step S321. Here, it is determined whether or not the positions of the control point candidates obtained in step S310 are within the section defined by the limit distance.

In step S3211, assuming that two anchor points that partition a sequence into a unit approximation section are a1 and a2, and control point candidates corresponding thereto are respectively c1 and c2, a straight line that is a perpendicular to a straight line La connecting the anchor points and that passes through the point Pf furthest from the straight line La is calculated. Then, an intersection point of the obtained straight line and the straight line Lc is calculated, and this calculated point is assumed to be a limit point Clim, and the processing proceeds to step S3212. Specifically, the limit point Clim is on the perpendicular to the straight line La and on the straight line Lc.

Figure 16A:
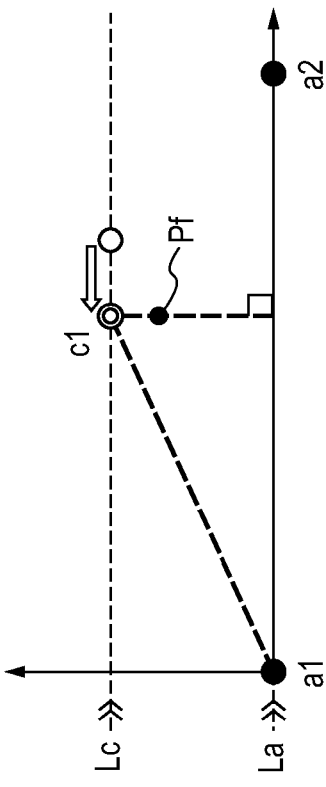
FIGS. 16A to 16D are explanatory diagrams with regard to the control point decision processing according to Embodiment 1.

In step S3212, first, as shown in FIG. 16A, the distance between the limit point Clim calculated in step S3211 and the anchor point a1 is assumed to be the limit distance |Clim−a1|, and the distance between the control point candidate c1 and the anchor point a1 is assumed to be |c1−a1|. At this time, assuming that the limit distance |Clim−a1| is the upper limit of the distance |c1−a1| between the anchor point a1 and the control point candidate c1, it is determined whether or not the condition of the limit distance |Clim−a1|>|c1−a1| is satisfied. Further, similarly, assuming that |Clim−a2| is the limit distance for the control point candidate c2, and it is determined whether or not the condition of the limit distance |Clim−a2|>|c2−a2| is satisfied. A combination of steps S3211 and S3212 described above realizes a limit distance excess determination means 321 in FIG. 2.

Then, processing in step S3221 is not performed on the control point candidate that satisfies the condition of the limit distance in step S3212, the control point candidate serves as a control point as is, and processing ends. Processing on a control point candidate that does not satisfy the condition of the limit distance as in FIG. 16A proceeds to step S3221 in control point candidate correction processing in step 322.

Figure 16B:
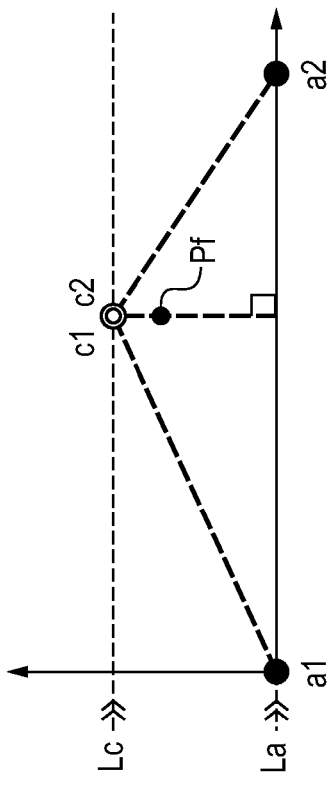

In step S3221, the position of the control point candidate that does not satisfy the limit distance condition is corrected so as to be the position of the limit point Clim as shown in FIG. 16B, this point is decided as a control point, and processing ends. Specifically, a control point candidate that does not satisfy the limit distance condition is shifted to the limit point. This processing realizes a control point candidate correction means 322 in FIG. 2. Further, a combination of steps S321 and S322 realizes a control point decision means 320. The above processing is performed on all the anchor points and control points, thereby achieving satisfaction of the limit distance conditions.

Then, a combination of control point candidate setting processing in step S310 and control point decision processing in step S320 that have been described above realizes a control point setting means 300 in FIG. 2.

Figure 16C:
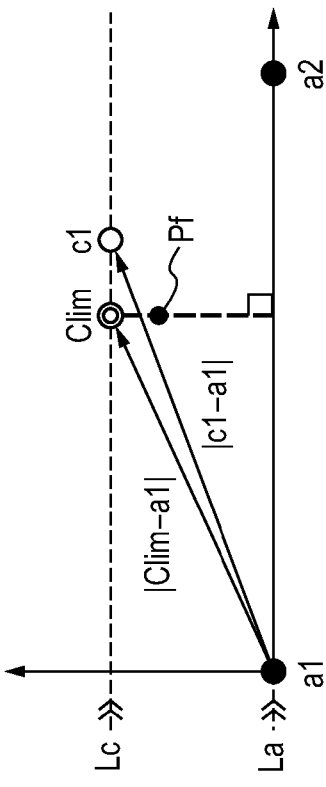
Figure 16D:
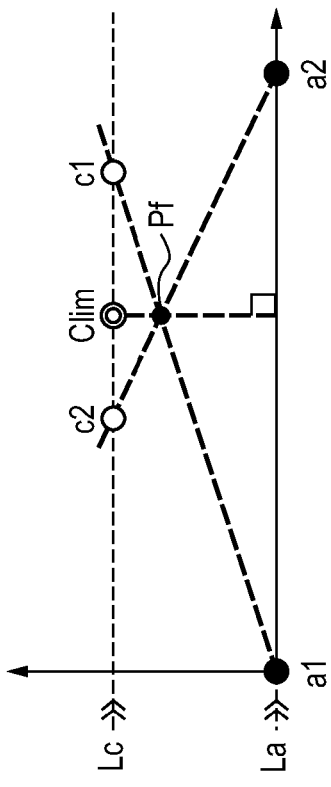

Even if the control points c1 and c2 are decided in a crossing state with respect to the positions of the anchor points a1 and a2 as shown in FIG. 16C, it is possible to perform correction so as to achieve a state as shown in FIG. 16D by performing the above control point decision processing. Specifically, the approximation curve can be prevented from having a peak due to the crossing of the control points.

As described above, if anchor points and control points are decided with respect to the entire image to be processed, ultimately in step S400, generated data is output as vector data in which "end points" having the same coordinates are connected. Connection may be performed, for example, by storing an end point in association with information indicating connection, or if the beginning and end of a coordinate point sequence are end points to be connected, it is not particularly necessary to perform processing as long as how processing is performed at the time of output is decided. Further, output includes storage of generated vector data in a file storage unit or transmission thereof to an output apparatus such as a display or a printer. This processing realizes a data output means 400 in FIG. 2.

According to the present embodiment, by the above configuration and procedure, vector data can be generated by lightweight processing while maintaining, after the number of anchor points has been reduced, high approximation precision with respect to raster data serving as the basis.

Embodiment 2

In Embodiment 1, in anchor point decision processing, elimination processing is performed if another anchor point candidate exists within two coordinate points before and after an anchor point candidate of interest. However, in a case in which coordinate points included between anchor point candidates are separated by three points or more, even if a redundant anchor point candidate exists, such a point cannot be eliminated. According to the present embodiment, if a sequence is partitioned into a unit approximation section in a range that can be represented by a quadratic curve, it is possible to perform approximation processing without failure, and thus further anchor point candidate elimination may be performed.

In view of this, in the present embodiment, the priorities of adjacent anchor point candidates are compared, and then elimination processing is performed. Further, if elimination is performed by comparing anchor point candidates, the result of the elimination is overwritten on anchor point candidate information, and determination is to be performed again on adjacent anchor point candidates based on the result of overwriting. This enables elimination processing in a wider range, and can contribute to the reduction of the amount of data.

Figure 17:
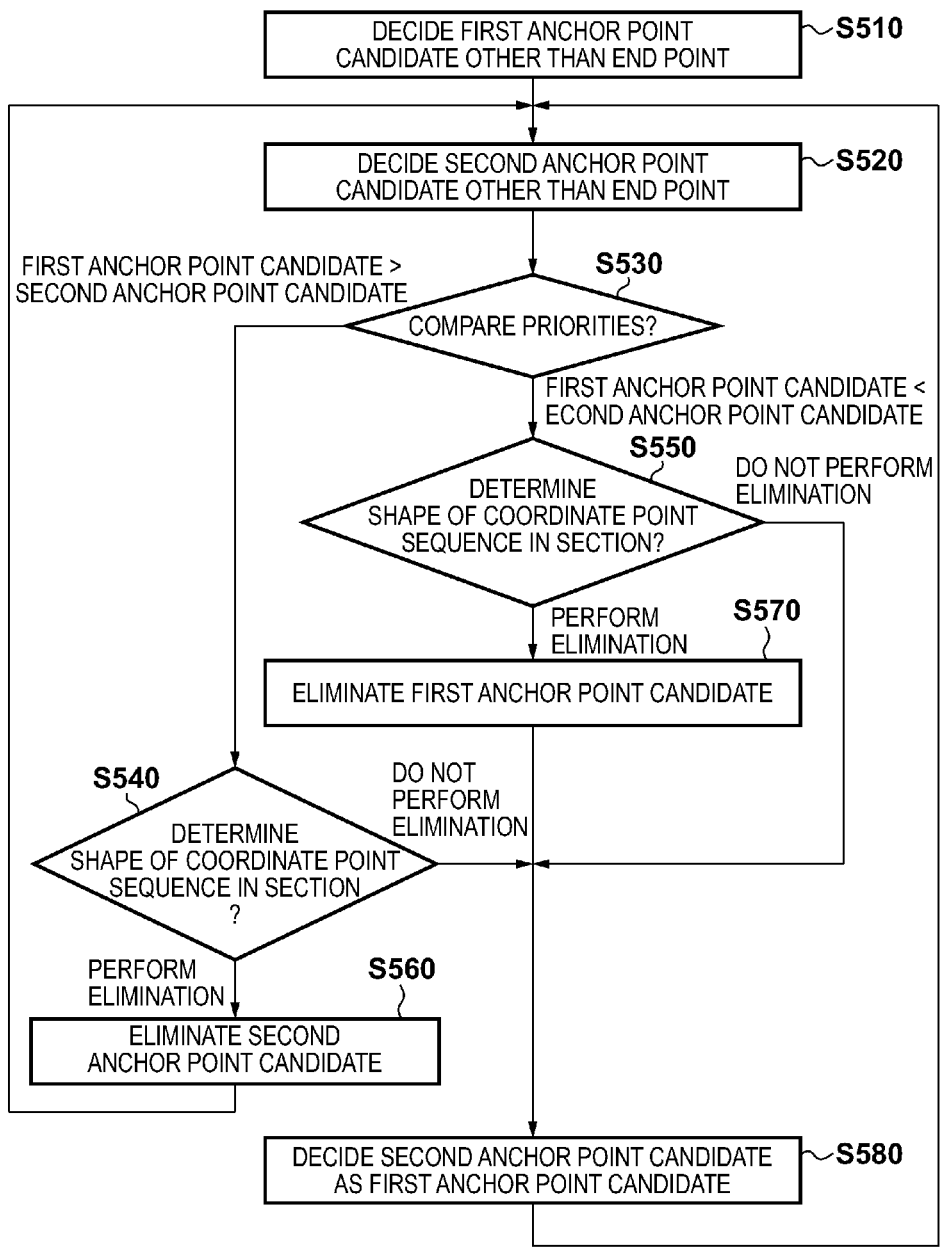
FIG. 17 is a flowchart showing anchor point decision processing according to Embodiment 2.

FIG. 17 shows a processing flow of the present embodiment. This procedure is a procedure of point-of-interest determination processing in the present embodiment to be executed as step S220 in FIG. 3 in Embodiment 1, instead of FIG. 11.

First, a coordinate point sequence is tracked, and an anchor point candidate detected first is extracted as a first anchor point candidate in step S510. Next, in step S520, the coordinate point sequence is further tracked from the first anchor point candidate, and an anchor point candidate detected next is assumed to be a second anchor point candidate. Although not shown here, if there is no second anchor point candidate, specifically, if an anchor point candidate that is to serve next as a second anchor point candidate is an end point at the end of the coordinate point sequence, or there is no new candidate since processing has ended with respect to all anchor point candidates, processing in FIG. 17 ends.

Next, in step S530, the priorities of the first anchor point candidate and the second anchor point candidate are compared. If the priority of the second anchor point candidate is lower, the processing proceeds to step S540.

In step S540, the shape of a coordinate point sequence in a unit approximation section partitioned by the first anchor point candidate and the second anchor point candidate is determined. The shape determined here may be an angle of the coordinate point sequence, the length thereof, the number of coordinate points, or the number of eliminated anchor point candidates. If it is determined here that elimination is to be performed, the processing proceeds to step S560, where the second anchor point candidate is eliminated, and the processing returns to step S520. If it is determined that elimination is not to be performed, the processing proceeds to step S580. Step S580 will be described below. Further, the series of processes in 5540 and 5560 may be replaced by processing in FIG. 12 in Embodiment 1. Note that "anchor point candidate of interest $Q_j$" in FIG. 12 should be read as the "second anchor point candidate" in this case. Then, if any of the processing in steps S2252, S2255, S2258, and S22511 is performed, assuming that elimination has been performed, the processing branches to step S520, and otherwise, the processing branches to step S580.

In step S530, if the priority of the first anchor point candidate is lower, the processing proceeds to step S550. In step S550, as in step S540, the shape of the coordinate point sequence in the unit approximation section partitioned by the first anchor point candidate and the second anchor point candidate is determined. The shape determined here may be an angle of the coordinate point sequence, the length thereof, the number of coordinate points, or the number of eliminated anchor point candidates. If it is determined here that elimination is to be performed, the processing proceeds to step S570, where the first anchor point candidate is eliminated, and the processing proceeds to step S580. Further, if it is determined that elimination is not to be performed, the processing proceeds to step S580 directly. In step S580, the point that is currently of interest as the second anchor point candidate is assumed to be the first anchor point candidate, and the processing returns to step S520. Further, the series of processes in steps S550 and S570 may be replaced by processing in FIG. 12 in Embodiment 1. Note that "anchor point candidate of interest $Q_j$" in FIG. 12 should be read as "first anchor point candidate" in this case. Then, if any of the processing in steps S2252, S2255, S2258, and S22511 is performed, the processing branches to step S580, assuming that elimination has been performed, and otherwise, the processing branches to step S520.

The above processing is performed until the number of processed coordinate points reaches the total number of coordinate points in an open contour or a closed contour. However, if the processing in FIG. 17 is performed as anchor point decision processing, this processing is performed on all the selected anchor point candidates. By this processing, anchor point candidates can be compared successively in accordance with the tracking direction of a coordinate point sequence, and thus it is possible to execute anchor point decision processing that is not limited to the number of coordinate points between anchor point candidates.

Embodiment 3

In Embodiment 1, in anchor point candidate extraction processing, anchor point candidate information is extracted by tracking the coordinate point sequence extracted in step S120. At this time, it is necessary to calculate the angle of a coordinate point sequence for attributes such as "inflection point" and "critical point" according to which extraction is performed using a change in angle, and thus as shown in FIG. 18A, determination is performed on every other point.

Figure 18A:
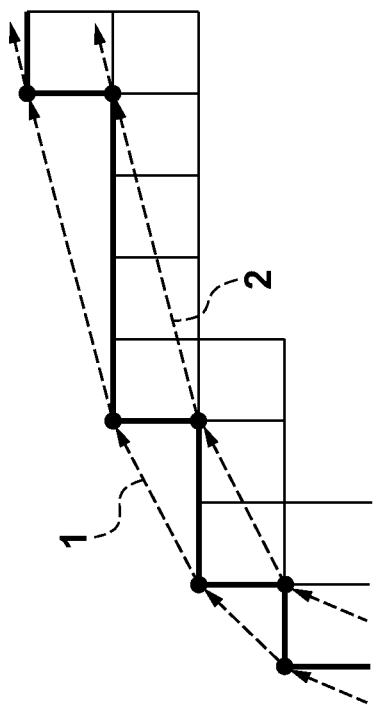
FIGS. 18A and 18B are diagrams showing the difference in the coordinate point tracking between Embodiments 1 and 3.

However, at this time, even in a case of the same coordinate point sequences, different extraction results will be obtained in a case in which a coordinate point sequence 1 in FIG. 18A is determined and a case in which a coordinate point sequence 2 in FIG. 18A is determined, and thus the final approximation results may not match in the two cases.

Figure 18B:
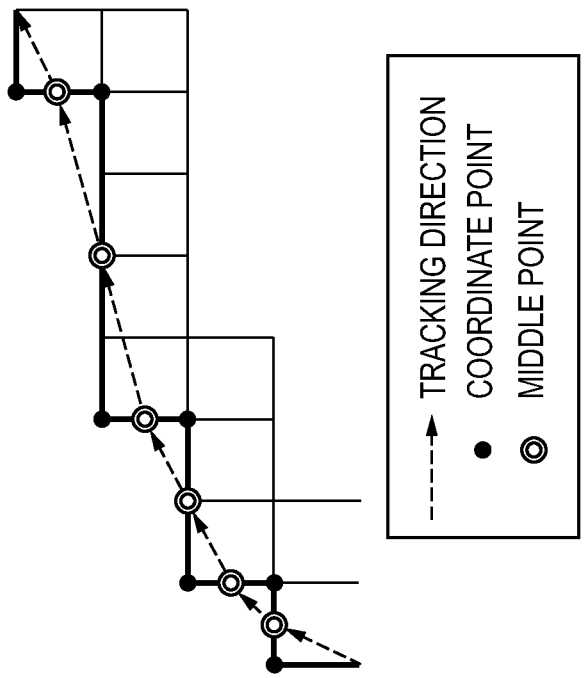

In order to handle this, in anchor point candidate information extraction processing in Embodiment 1, "inflection point" and "critical point" determination in which anchor point candidate information is extracted using a change in angle may be performed using middle points of sides that connect the coordinate point sequences, as shown in FIG. 18B. Specifically, a configuration may be adopted in which point-of-interest determination processing in S212 in FIG. 7 is performed along the flowchart shown in FIG. 19, instead of the processing in FIG. 8, and side-of-interest determination processing in S213 is executed in accordance with the processing in FIG. 20, instead of FIG. 9. Note that it is sufficient to perform processing other than anchor point candidate information extraction processing as in the processing in Embodiment 1.

Here, as shown in FIG. 6, a point in a coordinate point sequence that is currently of interest is referred to as a point of interest $P_i$ (i=1, 2, and so on, n). Then, coordinate points in the opposite direction to the coordinate point sequence tracking direction viewed from the point of interest $P_i$ are assumed to be $P_{i-1}$, $P_{i-2}$, and so on, and coordinate points in the forward direction to the coordinate point sequence tracking direction are referred to as $P_{i+1}$, $P_{i+2}$, and so on. Further, a middle point of a side that connects the coordinate point $P_i$ and the coordinate point $P_{i+1}$ is referred to as $C_l$ (l=1, 2, and so on, n−1).

Then, middle points between coordinate points in the opposite direction to the coordinate point sequence tracking direction viewed from the point of interest $P_i$ are assumed to be $C_{l-1}$, $C_{l-2}$, and so on, and middle points between coordinate points in the forward direction to the coordinate point sequence tracking direction are referred to as $C_{l+1}$, $C_{l+2}$, and so on. Below is a description of details of anchor point candidate information extraction processing in the present embodiment with reference to the flowchart shown in FIG. 19.

Figure 19:
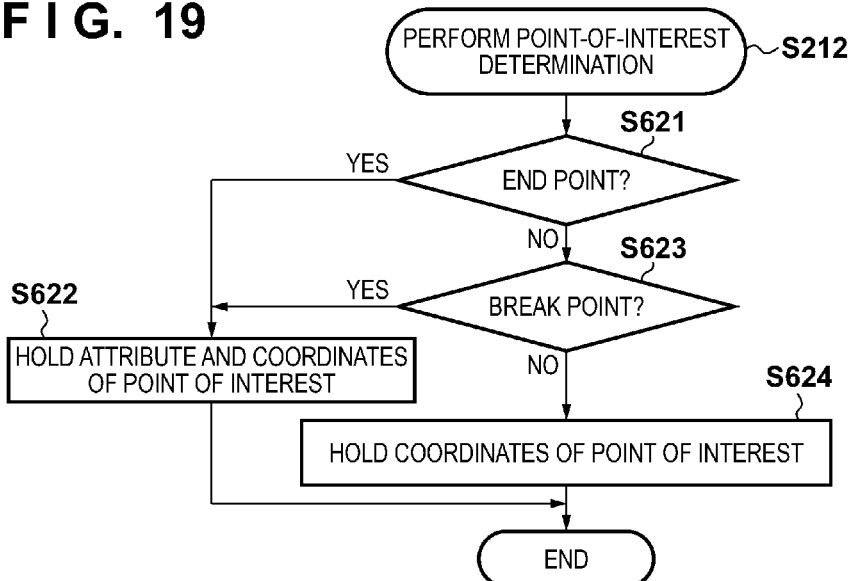
FIG. 19 is a flowchart showing anchor point candidate information extraction processing according to Embodiment 3.

It is determined in step S621 in FIG. 19 whether the point of interest is an end point. This processing may be the same as that in step S2121 in FIG. 8 in Embodiment 1. If it is determined that the point is an end point, the processing proceeds to step S622, where the coordinates of the point of interest $P_i$ itself and the attribute "end point" are held, and processing ends.

If it is determined in step S621 that the point is not an end point, the processing proceeds to break point determination in step S623. This processing may be the same as that in step S2123 in FIG. 8 in Embodiment 1. If it is determined that the point is a break point, the processing proceeds to step S622, where the coordinates of the point of interest $P_i$ itself and the attribute "break point" are held, and processing ends.

If it is determined in step S623 that the point is not a break point, the processing proceeds to step S624, where only the coordinates of the point of interest $P_i$ itself are held, and processing directly ends.

Figure 20:
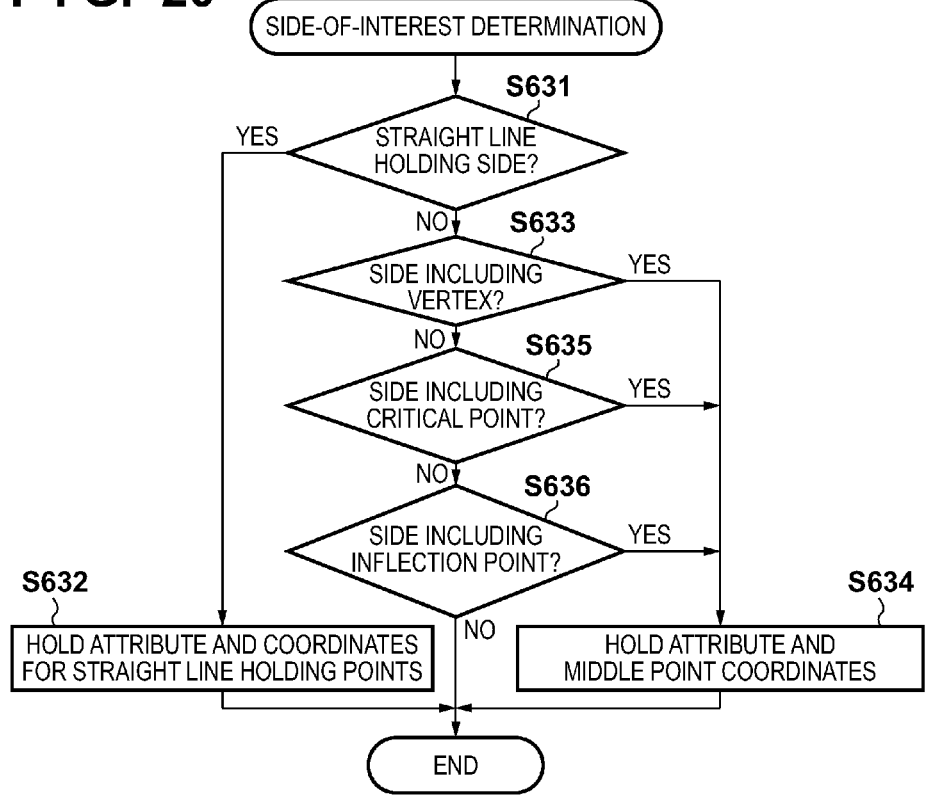
FIG. 20 is a flowchart showing anchor point candidate determination processing for a point of interest according to Embodiment 3.

Anchor point candidate determination for the point of interest $P_i$ itself in step S212 has ended to this point. Next, the processing proceeds to step S213, where it is determined whether or not an anchor point candidate is to be set on the side of interest $P_iP_{i+1}$. FIG. 20 shows a detailed processing flow thereof in the present embodiment.

First, in step S631, it is determined whether or not the side of interest $P_iP_{i+1}$ is a straight line holding side. This processing may be the same as that in step S2131 in FIG. 9 in Embodiment 1. If it is determined that the side of interest $P_iP_{i+1}$ is a straight line holding side, the processing proceeds to step S632, where the coordinates of two points as in Embodiment 1 are set, and the attribute thereof is held as "straight line holding point", and processing ends.

If it is determined in step S631 that the side of interest $P_iP_{i+1}$ is not a straight line holding side, the processing proceeds to step S633, where it is determined whether the side includes a vertex. This processing may be the same as that in step S2133 in FIG. 9 in Embodiment 1. If it is determined that the side of interest $P_iP_{i+1}$ is a side including a vertex, the processing proceeds to step S634, where middle point coordinates of the line segment $P_iP_{i+1}$ and the attribute "vertex" are held, and processing ends.

If it is determined in step S633 that the side of interest $P_iP_{i+1}$ is not a side including a vertex, the processing proceeds to step S635, where it is determined whether the side includes a critical point. Here, middle point coordinates $C_l$ of the side of interest $P_iP_{i+1}$, middle point coordinates $C_{l-1}$ of the side $P_{i-1}P_i$ and middle point coordinates $C_{l+1}$ of the side $P_iP_{i+1}$ are assumed to be reference points. At this time, a side including a critical point is a side in which an angle θ formed by a line segment $C_{l-1}C_l$ and a line segment $C_lC_{l+1}$ is calculated, and the angle θ is equal to or greater than a threshold value T6 as shown in FIG. 21A. The threshold value T6 is 25° in the present embodiment. If it is determined that the side of interest $P_iP_{i+1}$ is a side including a critical point, the processing proceeds to step S634, where the middle point coordinates $C_l$ of the line segment $P_iP_{i+1}$ and the attribute "critical point" are held, and processing ends.

If it is determined in step S635 that the side of interest $P_iP_{i+1}$ is not a side including a critical point, the processing proceeds to step S636, where it is determined whether the side includes an inflection point. Here, the middle point coordinates $C_l$ of the side of interest $P_iP_{i+1}$, the middle point coordinates $C_{l-1}$ of the side $P_{i-1}P_i$, the middle point coordinates $C_{l-2}$ of the side $P_{i-2}P_{i-1}$, and the middle point coordinates $C_{l+1}$ of the side $P_iP_{i+1}$ are assumed to be reference points. At this time, a side including an inflection point is a side in which as shown in FIG. 21B, the gradient α of the line segment $C_{l-2}C_{l-1}$, the gradient β of the line segment $C_{l-1}C_l$, and the gradient γ of the line segment $C_lC_{l+1}$ are calculated, β−α and γ−β each indicating the amount of change in the gradient are calculated, and the positive/negative signs of the amounts of change in the gradient are switched. However, if the absolute value of the amount of change in the gradient β−α is a threshold value T7 or less, until the absolute value of β−α takes a value equal to or greater than the threshold value (equal to or greater than T7, specifically), determination is performed while changing the line segment having the gradient α so as to be $C_{l-3}C_{l-2}$, $C_{l-4}C_{l-3}$, and so on. The threshold value T7 is $1.0 \times 10^{-7}$ in the present embodiment. If it is determined that the side of interest $P_iP_{i+1}$ is a side including an inflection point, the processing proceeds to step S634, where middle point coordinates $C_l$ of the line segment $P_iP_{i+1}$ and the attribute "inflection point" are held, and processing ends.

If it is determined in step S636 that the side of interest $P_iP_{i+1}$ is not a side including an inflection point, processing ends directly.

Anchor point candidate determination on the side of interest $P_iP_{i+1}$ in step S213 has ended so far. Next, in step S214, it is determined whether or not the current point of interest is a terminal point of the coordinate point sequence that is being tracked. If it is determined that the point is not a terminal point, the point of interest is shifted to the next point on the coordinate point sequence in step S215, and the processing proceeds to step S212 again. When it is determined that the point is a terminal point, anchor point candidate information extraction processing ends.

By implementing the above processing as anchor point candidate information extraction processing, without needing to perform determination as to whether an inflection point and a critical point that are extracted using a change in angle are each an even-numbered point of interest or an odd-numbered point of interest, it is possible to obtain results of anchor point extraction in one-to-one correspondence with the input coordinate point sequence.

Embodiment 4

In Embodiment 3, a middle point of a side between input coordinate point sequences serves as an extraction target in anchor point candidate information extraction processing. Also, similar processing may also be performed in control point candidate setting processing. Specifically, even if a middle point of a side between input coordinate point sequences is an extraction target when the furthest point Pf is extracted in maximum angle tangent line decision processing, similar effects are obtained.

Embodiment 5

In Embodiment 1, in anchor point candidate information extraction processing, a point with an attribute having the higher priority is extracted in descending order in anchor point decision processing, and extracted anchor point candidates each hold an attribute uniquely decided. In contrast, a point having properties of a plurality of attributes may hold multiple attributes. Vectorization with still higher precision can be realized by changing the priority and how to set a tangential direction depending on a combination of multiple attributes thereof such as, for example, in a case of a point having the attributes "critical point" and "inflection point", by increasing the priority thereof and setting the same tangential direction as that in the case of "inflection point".

Embodiment 6

In Embodiment 1, at the time of maximum angle tangent line decision processing, a range in which reference points are extracted is assumed to include all points except one point nearest to each anchor point in a coordinate point sequence in a unit approximation section that is partitioned between anchor points. In contrast, an extraction range may be changed using the attribute of an anchor point. For example, a configuration may be adopted in which in the case of an anchor point whose attribute is "inflection point" for smoothness, two nearest points are excluded from a corresponding range in which reference points are extracted, one nearest point is also included therein in the case of "straight line holding point" and "vertex", and the like.

Embodiment 7

In Embodiment 1, only in a case in which the number of coordinate points included between anchor points is less than that necessary for obtaining a maximum angle tangent line when maximum angle tangent line decision processing is performed, control points are not added, and only anchor points are output, thereby obtaining a straight line section. In contrast, a section that can be considered as a straight line section may be additionally included. For example, a configuration may be adopted in which if a value obtained by dividing the length of a line segment a1a2 that connects the anchor points a1 and a2 by the distance Df is equal to or less than a threshold value T8, that corresponding section is assumed to be a straight line portion, and a control point is not output. Specifically, assuming that the anchor points are connected by a line segment, if the longest distance between the line segment and coordinate points distributed between the anchor points constitutes the constant percentage T8 or less relative to the length of that line segment, it is determined that the anchor points constitute a straight line section, and a control point is not added. This threshold value T8 is set to 30 in the present embodiment.

Embodiment 8

In Embodiment 1, although whether the position of a control point is outside the limit section is determined using the length of a line segment in limit distance excess determination processing in step S321, the position of a control point may be determined by other means.

For example, first, a limit point Clim is provided as in Embodiment 1. Next, an angle Clima1a2 formed by a line segment that connects an anchor point a1 and an anchor point a2 and a line segment that connects the anchor point a1 and the limit point Clim is used as a limit angle of a control point candidate c1, and similarly, a limit angle of a control point candidate c2 is assumed to be an angle Clima2a1. Then, it is determined whether the angle c1a1a2 formed by the control point candidate c1 and the angle c2a2a1 formed by the control point candidate c2 are each smaller than the limit angle. Then, if the angles are smaller, similar effects can also be expected by moving the control points c1 and c2 to the limit point Clim.

Embodiment 9

In Embodiment 1, it is determined whether or not the position of a control point is in the limit section, and control point candidate correction is performed according to the result thereof. In the present embodiment, intersection determination processing is performed in which it is determined whether or not a line segment that connects an anchor point a1 and a control point c1 and a line segment that connects an anchor point a2 and a control point c2 intersect, and only in a case in which the line segments intersect, a control point candidate is corrected.

An example of an intersection determination processing method at this time will be described. Examples of such a method include a method for determining, using a vector a1a2 that connects an anchor point a1 and an anchor point a2 and a vector c1c2 that connects a control point candidate c1 and a control point candidate c2, whether or not the direction of the vector a1a2 and the direction of the vector c1c2 are the same. Further, another example is a method of determining whether or not the length |a1c1| of a line segment a1c1 that connects the anchor point a1 and the control point candidate c1 is shorter than the length |a1c2| of a line segment a1c2 that connects the anchor point a1 and the control point candidate c2.

As described in the above example, with regard to the determination as to whether the line segment that connects the anchor point a1 and the control point c1 and the line segment that connects the anchor point a2 and the control point c2 intersect, as long as the relative positional relationship between four points, namely, the anchor points a1 and a2 and the control points c1 and c2 can be determined, any method can be used therefor. These can be easily implemented by a known graphic calculation method.

Note that although Embodiment 1 has a particular effect that enables correction even in a case, other than the case of intersection, in which control points are decided at one-sided positions, the present embodiment does not have such an effect.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-196092, filed Sep. 1, 2010, which is hereby incorporated by reference herein in its entirety.

What is claimed is:

1. An image processing apparatus comprising a processor and a memory, wherein the processor functions as:

an anchor point setting unit configured to set a first anchor point and a second anchor point that partition a coordinate point sequence expressing a contour of an object in image data into a unit approximation section of a cubic Bezier curve;

a control point candidate setting unit configured to determine a furthest point most distant from a first straight line, that passes through the first and second anchor points, in a coordinate point sequence included in the unit approximation section that is partitioned by the first and second anchor points, and to set a first control point candidate and a second control point candidate on a second straight line that is parallel to the first straight line, wherein a distance between the first straight line and the second straight line is 4/3 times a distance between the first straight line and the furthest point; and a control point decision unit configured to decide, as a limit point, a point that is on a perpendicular to the first straight line, the perpendicular passing through the furthest point, and that is at 4/3 times the distance between the first straight line and the furthest point, and to decide a first control point and a second control point based on the first control point candidate, the second control point candidate and the limit point, wherein the control point decision unit decides the limit point as the first control point if a first distance between the first control point candidate and the first anchor point exceeds a first limit distance between the limit point and the first anchor point, wherein the control point decision unit decides the first control point candidate as the first control point if the first distance does not exceed the first limit distance, wherein the control point decision unit decides the limit point as the second control point if a second distance between the second control point candidate and the second anchor point exceeds a second limit distance between the limit point and the second anchor point, and wherein the control point decision unit decides the second control point candidate as the second control point if the second distance does not exceed the second limit distance.

2. The image processing apparatus according to claim 1, wherein the processor further functions as:
an image input unit configured to input image data; and
a coordinate point sequence extraction unit configured to generate a coordinate point sequence expressing a contour of an object in the image data input by the image input unit.

3. The image processing apparatus according to claim 1, wherein the processor further functions as:
an approximation data output unit configured to output the first anchor point, the second anchor point, the first control point, and the second control point as approximation data that approximates a shape of the contour in the unit approximation section.

4. The image processing apparatus according to claim 1, wherein the anchor point setting unit sets the first and second anchor points so as to have one or less maximal value or minimal value of the contour approximated in the coordinate point sequence in the unit approximation section in an orthogonal coordinate system having the first straight line as an axis.

5. The image processing apparatus according to claim 4, wherein the anchor point setting unit extracts at least a vertex at which the contour approximated in the coordinate point sequence has the maximal value or the minimal value and an inflection point at which a sign of a curvature of the contour approximated in the coordinate point sequence changes.

6. The image processing apparatus according to claim 5, wherein the anchor point setting unit extracts, as the vertex, a point at which positive and negative signs of a gradient of the contour approximated in the coordinate point sequence are switched, and extracts, as the inflection point, a point at which positive and negative signs of an amount of change in the gradient of the contour approximated in the coordinate point sequence are switched.

7. The image processing apparatus according to claim 1, wherein the control point candidate setting unit sets the first control point candidate on a straight line that connects the first anchor point and a coordinate point in the unit approximation section and sets the second control point candidate on a straight line that connects the second anchor point and a coordinate point in the unit approximation section and that forms the largest angle with the first straight line.

8. The image processing apparatus according to claim 1, wherein the processor further functions as:
a straight line section determination unit configured to determine whether or not the unit approximation section is a section that may be represented as a straight line,
wherein if it is determined that the unit approximation section is not the straight line section, the control point candidate setting unit sets the first and second control point candidates, and if it is determined that the unit approximation section is the straight line section, the control point candidate setting unit does not set the first and second control point candidates.

9. The image processing apparatus according to claim 8, wherein the straight line section determination unit determines that the unit approximation section is the straight line section if a value obtained by dividing a distance between the first anchor point and the second anchor point by a distance to the furthest point most distant from the first straight line in the coordinate point sequence included in the unit approximation section is equal to or greater than a threshold value.

10. An image processing apparatus comprising a processor and a memory, wherein the processor functions as:
an anchor point setting unit configured to set a first anchor point and a second anchor point that partition a coordinate point sequence expressing a contour of an object in image data into a unit approximation section of a cubic Bezier curve;
a control point candidate setting unit configured to determine a furthest point most distant from a first straight line, that passes through the first and second anchor points, in a coordinate point sequence included in the unit approximation section that is partitioned by the first and second anchor points, and to set a first control point candidate and a second control point candidate on a second straight line that is parallel to the first straight line, wherein a distance between the first straight line and the second straight line is 4/3 times a distance between the first straight line and the furthest point; and
a control point decision unit configured to decide, as a limit point, a point that is on a perpendicular to the first straight line, the perpendicular passing through the furthest point, and that is at 4/3 times the distance between the first straight line and the furthest point, and to decide a first control point and a second control point based on the first control point candidate, the second control point candidate and the limit point,
wherein the control point decision unit determines whether or not a first line segment that connects the first control point candidate and the first anchor point and a second line segment between the second control point candidate and the second anchor point intersect with each other,
wherein the control point decision unit decides the limit point as the first and second control points if it is determined that the first line segment and the second line segment intersect with each other, and
wherein the control point decision unit decides the first and second control point candidates as the first and second control points if it is determined that the first line segment and the second line segment do not intersect with each other.

11. A non-transitory computer-readable recording medium that has recorded thereon a program for causing a computer to function as:
   an anchor point setting means for setting a first anchor point and a second anchor point that partition a coordinate point sequence expressing a contour of an object in image data into a unit approximation section of a cubic Bezier curve;
   a control point candidate setting means for determining a furthest point most distant from a first straight line, that passes through the first and second anchor points, in a coordinate point sequence included in the unit approximation section that is partitioned by the first and second anchor points, and setting a first control point candidate and a second control point candidate on a second straight line that is parallel to the first straight line, wherein a distance between the first straight line and the second straight line is 4/3 times a distance between the first straight line and the furthest point; and
   a control point decision means for deciding, as a limit point, a point that is on a perpendicular to the first straight line, the perpendicular passing through the furthest point, and that is at 4/3 times the distance between the first straight line and the furthest point, and deciding a first control point and a second control point based on the first control point candidate, the second control point candidate and the limit point,
   wherein the control point decision means decides the limit point as the first control point if a first distance between the first control point candidate and the first anchor point exceed a first limit distance between the limit point and the first anchor point,
   wherein the control point decision means decides the first control point candidate as the first control point if the first distance does not exceed the first limit distance,
   wherein the control point decision means decides the limit point as the second control point if a second distance between the second control point candidate and the second anchor point exceeds a second limit distance between the limit point and the second anchor point, and
   wherein the control point decision means decides the second control point candidate as the second control point if the second distance does not exceeds the second limit distance.

12. An image processing method executed by an image processing apparatus comprising a processor and a memory, the method comprising:
   an anchor point setting step of setting, by the image processing apparatus, a first anchor point and a second anchor point that partition a coordinate point sequence expressing a shape of a contour in image data into a unit approximation section of a cubic Bezier curve;
   a control point candidate setting step of determining, by the image processing apparatus, a furthest point most distant from a first straight line, that passes through the first and second anchor points, in a coordinate point sequence included in the unit approximation section that is partitioned by the first and second anchor points, and setting a first control point candidate and a second control point candidate on a second straight line that is parallel to the first straight line, wherein a distance between the first straight line and the second straight line is 4/3 times a distance between the first straight line and the furthest point; and
   a control point decision step of deciding, as a limit point by the image processing apparatus, a point that is on a perpendicular to the first straight line, the perpendicular passing through the furthest point, and that is at 4/3 times the distance between the first straight line and the furthest point, and deciding, by the image processing apparatus, a first control point and a second control point based on the first control point candidate, the second control point candidate and the limit point,
   wherein the limit point is decided in the control point decision step as the first control point if a first distance between the first control point candidate and the first anchor point exceeds a first limit distance between the limit point and the first anchor point,
   wherein the first control point candidate is decided in the control point decision step as the first control point if the first distance does not exceed the first limit distance,
   wherein the limit point is decided in the control point decision step as the second control point if a second distance between the second control point candidate and the second anchor point exceeds a second limit distance between the limit point and the second anchor point, and
   wherein the second control point candidate is decided in the control point decision step as the second control point if the second distance does not exceed the second limit distance.

13. A non-transitory computer-readable recording medium that has recorded thereon a program for causing a computer to function as:
   anchor point setting unit configured to set a first anchor point and a second anchor point that partition a coordinate point sequence expressing a contour of an object in image data into a unit approximation section of a cubic Bezier curve;
   control point candidate setting unit configured to determine a furthest point most distant from a first straight line, that passes through the first and second anchor points, in a coordinate point sequence included in the unit approximation section that is partitioned by the first and second anchor points, and set a first control point candidate and a second control point candidate on a second straight line that is parallel to the first straight line, wherein a distance between the first straight line and the second straight line is 4/3 times a distance between the first straight line and the furthest point; and
   control point decision unit configured to decide, as a limit point, a point that is on a perpendicular to the first straight line, the perpendicular passing through the furthest point, and that is at 4/3 times the distance between the first straight line and the furthest point, and decide a first control point and a second control point based on the first control point candidate, the second control point candidate and the limit point,
   wherein the control point decision unit determines whether or not a first line segment that connects the first control point candidate and the first anchor point and a second line segment between the second control point candidate and the second anchor point intersect with each other,
   wherein the control point decision unit decides the limit point as the first and second control points if it is determined that the first line segment and the second line segment intersect with each other, and
   wherein the control point decision unit decides the first and second control point candidates as the first and second control points if it is determined that the first line segment and the second line segment do not intersect with each other.

14. An image processing apparatus comprising a processor and a memory, wherein the processor functions as:
an anchor point setting unit configured to set a first anchor point and a second anchor point that partition a coordinate point sequence expressing a contour of an object in image data into a unit approximation section of a cubic Bezier curve;
a control point candidate setting unit configured to determine a furthest point most distant from a first straight line, that passes through the first and second anchor points, in a coordinate point sequence included in the unit approximation section that is partitioned by the first and second anchor points, and to set a first control point candidate and a second control point candidate on a second straight line that is parallel to the first straight line, wherein a distance between the first straight line and the second straight line is 4/3 times a distance between the first straight line and the furthest point; and
a control point decision unit configured to decide, as a limit point, a point that is on a perpendicular to the first straight line, the perpendicular passing through the furthest point, and that is at 4/3 times the distance between the first straight line and the furthest point, and to decide a first control point and a second control point based on the first control point candidate, the second control point candidate and the limit point,
wherein the control point decision unit decides the limit point as the first control point if a first angle formed by the first straight line and a line segment that connects the first anchor point and the first control point candidate is smaller than a first limit angle formed by the first straight line and a line segment that connect the first anchor point and the limit point,
wherein the control point decision unit decides the first control point candidate as the first control point if the first angle is not smaller than the first limit angle,
wherein the control point decision unit decides the limit point as the second control point if a second angle formed by the first straight line and a line segment that connects the second anchor point and the second control point candidate is smaller than a second limit angle formed by the first straight line and a line segment that connect the second anchor point and the limit point, and
wherein the control point decision unit decides the second control point candidate as the second control point if the second angle is not smaller than the second limit angle.

15. A non-transitory computer-readable recording medium that has recorded thereon a program for causing a computer to function as:
anchor point setting unit configured to set a first anchor point and a second anchor point that partition a coordinate point sequence expressing a contour of an object in image data into a unit approximation section of a cubic Bezier curve;
control point candidate setting unit configured to determine a furthest point most distant from a first straight line, that passes through the first and second anchor points, in a coordinate point sequence included in the unit approximation section that is partitioned by the first and second anchor points, and set a first control point candidate and a second control point candidate on a second straight line that is parallel to the first straight line, wherein a distance between the first straight line and the second straight line is 4/3 times a distance between the first straight line and the furthest point; and
control point decision unit configured to decide, as a limit point, a point that is on a perpendicular to the first straight line, the perpendicular passing through the furthest point, and that is at 4/3 times the distance between the first straight line and the furthest point, and decide a first control point and a second control point based on the first control point candidate, the second control point candidate and the limit point,
wherein the control point decision unit decides the limit point as the first control point if a first angle formed by the first straight line and a line segment that connects the first anchor point and the first control point candidate is smaller than a first limit angle formed by the first straight line and a line segment that connect the first anchor point and the limit point,
wherein the control point decision unit decides the first control point candidate as the first control point if the first angle is not smaller than the first limit angle,
wherein the control point decision unit decides the limit point as the second control point if a second angle formed by the first straight line and a line segment that connects the second anchor point and the second control point candidate is smaller than a second limit angle formed by the first straight line and a line segment that connect the second anchor point and the limit point, and
wherein the control point decision unit decides the second control point candidate as the second control point if the second angle is not smaller than the second limit angle.

16. An image processing method executed by an image processing apparatus comprising a processor and a memory, the method comprising:
an anchor point setting step of setting, by the image processing apparatus, a first anchor point and a second anchor point that partition a coordinate point sequence expressing a contour of an object in image data into a unit approximation section of a cubic Bezier curve;
a control point candidate setting step of determining, by the image processing apparatus, a furthest point most distant from a first straight line, that passes through the first and second anchor points, in a coordinate point sequence included in the unit approximation section that is partitioned by the first and second anchor points, and setting, by the image processing apparatus, a first control point candidate and a second control point candidate on a second straight line that is parallel to the first straight line, wherein a distance between the first straight line and the second straight line is 4/3 times a distance between the first straight line and the furthest point; and
a control point decision step of deciding, as a limit point by the image processing apparatus, a point that is on a perpendicular to the first straight line, the perpendicular passing through the furthest point, and that is at 4/3 times the distance between the first straight line and the furthest point, and deciding, by the image processing apparatus, a first control point and a second control point based on the first control point candidate, the second control point candidate and the limit point,
wherein it is determined in the control point decision step whether or not a first line segment that connects the first control point candidate and the first anchor point and a second line segment between the second control point candidate and the second anchor point intersect with each other,
wherein the limit point is determined in the control point decision step as the first and second control points if it is determined that the first line segment and the second line segment intersect with each other, and
wherein the first and second control point candidates are determined in the control point decision step as the first and second control points if it is determined that the first line segment and the second line segment do not intersect with each other.

17. An image processing method executed by an image processing apparatus comprising a processor and a memory, the method comprising:
  an anchor point setting step of setting, by the image processing apparatus, a first anchor point and a second anchor point that partition a coordinate point sequence expressing a contour of an object in image data into a unit approximation section of a cubic Bezier curve;
  a control point candidate setting step of determining, by the image processing apparatus, a furthest point most distant from a first straight line, that passes through the first and second anchor points, in a coordinate point sequence included in the unit approximation section that is partitioned by the first and second anchor points, and setting, by the image processing apparatus, a first control point candidate and a second control point candidate on a second straight line that is parallel to the first straight line, wherein a distance between the first straight line and the second straight line is 4/3 times a distance between the first straight line and the furthest point; and
  a control point decision step of deciding, as a limit point by the image processing apparatus, a point that is on a perpendicular to the first straight line, the perpendicular passing through the furthest point, and that is at 4/3 times the distance between the first straight line and the furthest point, and deciding, by the image processing apparatus, a first control point and a second control point based on the first control point candidate, the second control point candidate and the limit point,
  wherein the limit point is determined in the control point decision step as the first control point if a first angle formed by the first straight line and a line segment that connects the first anchor point and the first control point candidate is smaller than a first limit angle formed by the first straight line and a line segment that connect the first anchor point and the limit point,
  wherein the first control point candidate is determined in the control point decision step as the first control point if the first angle is not smaller than the first limit angle,
  wherein the limit point is determined in the control point decision step as the second control point if a second angle formed by the first straight line and a line segment that connects the second anchor point and the second control point candidate is smaller than a second limit angle formed by the first straight line and a line segment that connect the second anchor point and the limit point, and
  wherein the second control point candidate is determined in the control point decision step as the second control point if the second angle is not smaller than the second limit angle.

* * * * *